United States Patent
Shimura et al.

(10) Patent No.: US 10,630,161 B2
(45) Date of Patent: Apr. 21, 2020

(54) POWER SUPPLY APPARATUS AND IMAGE FORMING APPARATUS

(71) Applicant: CANON KABUSHIKI KAISHA, Tokyo (JP)

(72) Inventors: Yasuhiro Shimura, Yokohama (JP); Hiroki Asano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/058,289

(22) Filed: Aug. 8, 2018

(65) Prior Publication Data
US 2019/0058387 A1    Feb. 21, 2019

(30) Foreign Application Priority Data

Aug. 15, 2017 (JP) .................. 2017-156868

(51) Int. Cl.
| | | |
|---|---|---|
| *H02M 3/335* | (2006.01) | |
| *H02M 1/08* | (2006.01) | |
| *G03G 15/00* | (2006.01) | |
| *H02M 1/00* | (2006.01) | |
| *H02M 1/34* | (2007.01) | |

(52) U.S. Cl.
CPC .............. *H02M 1/08* (2013.01); *G03G 15/80* (2013.01); *H02M 3/33523* (2013.01); *H02M 3/33569* (2013.01); *H02M 2001/0009* (2013.01); *H02M 2001/0032* (2013.01); *H02M 2001/0035* (2013.01); *H02M 2001/342* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

| | | |
|---|---|---|
| 9,823,617 B2 | 11/2017 | Shimura et al. |
| 9,897,964 B2 | 2/2018 | Shimura |

(Continued)

FOREIGN PATENT DOCUMENTS

| | | |
|---|---|---|
| JP | 4370844 | 11/2009 |

OTHER PUBLICATIONS

U.S. Appl. No. 15/958,344, filed Apr. 20, 2018, by Yasuhiro Shimura et al.

(Continued)

*Primary Examiner* — Bryan R Perez
(74) *Attorney, Agent, or Firm* — Venable LLP

(57) ABSTRACT

The power supply apparatus includes a current detection unit configured to detect a current that flows through a first switching element of a transformer, and a control unit controls a turn-on time of the first switching element based on a feedback voltage from a secondary side of the transformer, controls a turn-on time of a second switching element based on a detection result of the current detection unit, and performs switching between a continuous control and an intermittent control based on the feedback voltage, the continuous control being a control to perform an operation of continuing a first period, the intermittent control being a control to perform an operation of alternately repeating the first period and a second period.

24 Claims, 11 Drawing Sheets

(56) References Cited

U.S. PATENT DOCUMENTS

| | | |
|---|---|---|
| 9,966,865 B2 | 5/2018 | Shimura et al. |
| 2012/0307529 A1* | 12/2012 | Chiba .................. H02M 1/08 363/17 |
| 2015/0249397 A1* | 9/2015 | Ogasawara ......... H02M 1/4266 315/200 R |
| 2016/0156271 A1* | 6/2016 | Nishijima ......... H02M 3/33523 363/21.12 |
| 2017/0005585 A1* | 1/2017 | Shimura ........... H02M 3/33569 |
| 2017/0176918 A1 | 6/2017 | Shimura et al. |
| 2018/0212508 A1 | 7/2018 | Kobayashi et al. |

OTHER PUBLICATIONS

U.S. Appl. No. 16/030,499, filed Jul. 9, 2018, by Yusuke Saito et al.
U.S. Appl. No. 16/057,636, filed Aug. 7, 2018, by Yasuhiro Shimura.
U.S. Appl. No. 16/058,280, filed Aug. 8, 2018, by Yasuhiro Shimura et al.

* cited by examiner

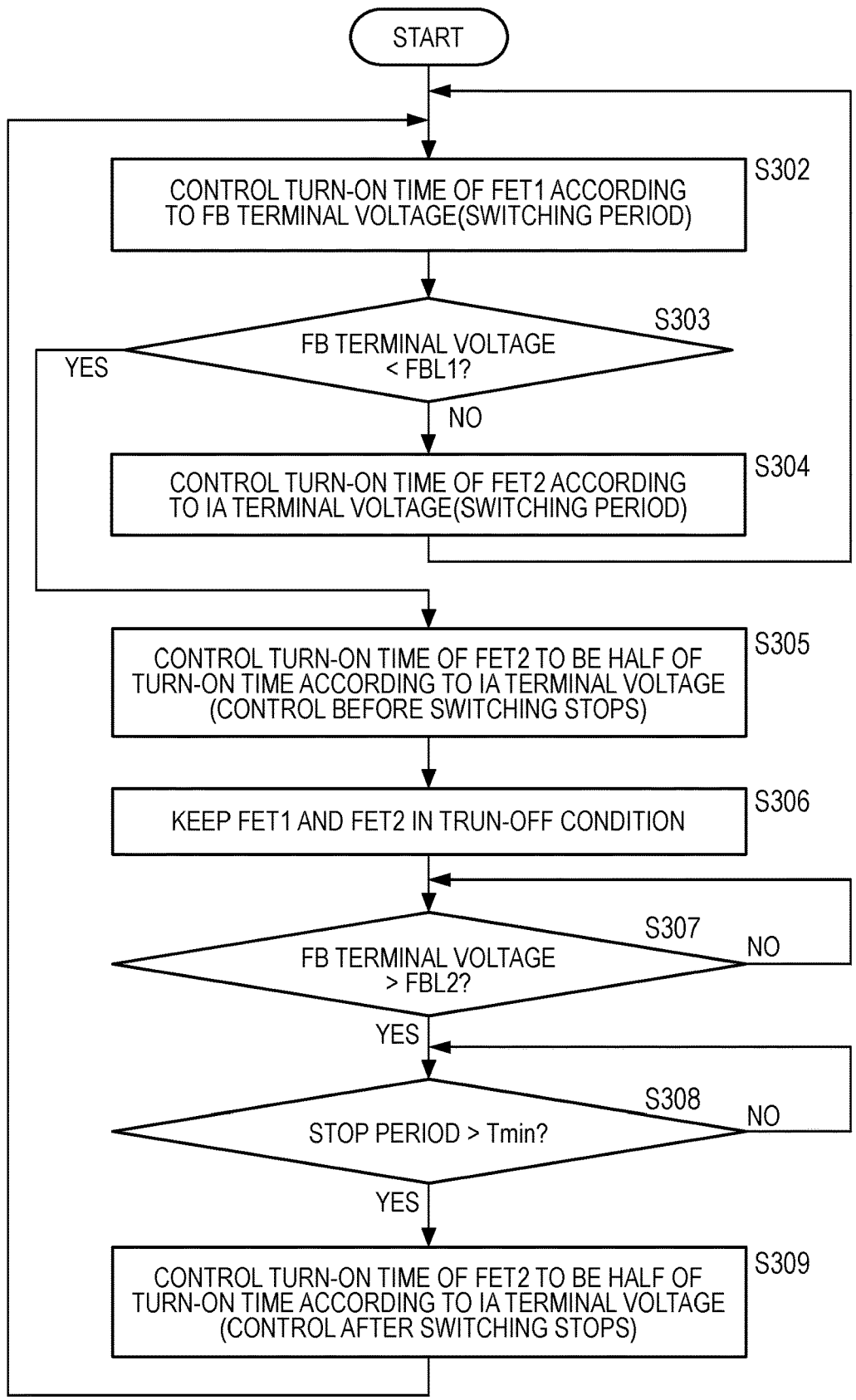

POWER SUPPLY APPARATUS AND IMAGE FORMING APPARATUS

BACKGROUND OF THE INVENTION

Field of the Invention

The present invention relates to a power supply apparatus and an image forming apparatus, and particularly, relates to a switching power supply apparatus that uses an active clamp system in an insulation type converter using a flyback transformer.

Description of the Related Art

In a switching power supply that converts alternating-current voltage of a commercial power supply or the like into direct-current voltage, the improvement in the efficiency of the switching power supply is demanded for reducing the power consumption of the switching power supply. Here, the efficiency of the switching power supply is represented by the ratio of the electric power output by the switching power supply to the electric power supplied to the switching power supply.

A construction in Japanese Patent No. 4370844 has been proposed as a unit for improving the efficiency in a condition in which the electric power to be output by the switching power supply is low, in a switching power supply using an active clamp system in an insulation type converter using a flyback transformer. Hereinafter, the condition in which the electric power to be output by the switching power supply is low is referred to as a light load condition.

However, in the switching power supply using the active clamp system, the improvement in the efficiency in the light load condition is further demanded.

SUMMARY OF THE INVENTION

For solving the above-described problem, an aspect of the present invention is a power supply apparatus including a transformer including a primary winding and a secondary winding; a first switching element connected in series with the primary winding of the transformer; a second switching element connected in parallel with the primary winding of the transformer; a capacitor connected in series with the second switching element and connected in parallel with the primary winding of the transformer together with the second switching element; a feedback unit configured to output a feedback voltage to a primary side according to a voltage induced in the secondary winding of the transformer; and a control unit configured to control turn-on or turn-off of the first switching element and the second switching element based on the feedback voltage, the control unit configured to perform an operation of alternately repeating a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition; and a current detection unit configured to detect a current that flows through the first switching element, wherein the control unit controls a turn-on time of the first switching element based on the feedback voltage, controls a turn-on time of the second switching element based on a detection result of the current detection unit, and performs switching between a continuous control and an intermittent control based on the feedback voltage, the continuous control being a control to perform an operation of continuing the first period, the intermittent control being a control to perform an operation of alternately repeating the first period and the second period.

Another aspect of the present invention is a power supply apparatus including a transformer including a primary winding on a primary side and a secondary winding on a secondary side, a first switching element connected in series with the primary winding of the transformer, a second switching element connected in parallel with the primary winding of the transformer, a capacitor connected in series with the second switching element and connected in parallel with the primary winding of the transformer together with the second switching element, a feedback unit configured to output a feedback voltage to a primary side according to a voltage induced in the secondary winding of the transformer, and a control unit configured to control turn-on or turn-off of the first switching element and the second switching element based on the feedback voltage, the control unit configured to perform an operation of alternately repeating a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition, a current detection unit configured to detect a current that flows through the first switching element, and a voltage detection unit configured to detect an input voltage supplied to the primary side of the transformer, wherein the control unit controls a turn-on time of the first switching element based on the feedback voltage, controls a turn-on time of the second switching element based on detection results of the current detection unit and the voltage detection unit, and performs switching between a continuous control and an intermittent control based on the feedback voltage, the continuous control being a control to perform an operation of continuing the first period, the intermittent control being a control to perform an operation of alternately repeating the first period and the second period.

Another aspect of the present invention is an image forming apparatus including an image forming unit configured to perform image formation on a recording member; and a power supply apparatus configured to supply electric power to the image forming apparatus, the power supply apparatus including a transformer including a primary winding on a primary side and a secondary winding on a secondary side, a first switching element connected in series with the primary winding of the transformer, a second switching element connected in parallel with the primary winding of the transformer, a capacitor connected in series with the second switching element and connected in parallel with the primary winding of the transformer together with the second switching element, a feedback unit configured to output a feedback voltage to a primary side according to a voltage induced in the secondary winding of the transformer, and a control unit configured to control turn-on or turn-off of the first switching element and the second switching element based on the feedback voltage, the control unit configured to perform an operation of alternately repeating a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition, a current detection unit configured to detect a current that flows through the first switching element, wherein the control unit controls a turn-on time of the first switching element based on the feedback voltage, controls a turn-on time of the second switching element based on a detection result of the current detection unit, and performs switching between a continuous control and an intermittent control based on the feedback voltage, the continuous control being a control to perform an operation of continuing the first period, the intermittent control being a control to perform an operation of alternately repeating the first period and the second period.

Another aspect of the present invention is an image forming apparatus including an image forming unit configured to perform image formation on a recording member; and a power supply apparatus configured to supply electric power to the image forming apparatus, the power supply apparatus including a transformer including a primary winding and a secondary winding, a first switching element connected in series with the primary winding of the transformer, a second switching element connected in parallel with the primary winding of the transformer, a capacitor connected in series with the second switching element and connected in parallel with the primary winding of the transformer together with the second switching element, a feedback unit configured to output a feedback voltage to a primary side according to a voltage induced in the secondary winding of the transformer, and a control unit configured to control turn-on or turn-off of the first switching element and the second switching element based on the feedback voltage, the control unit configured to performing an operation of alternately repeating a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition, a current detection unit configured to detect a current that flows through the first switching element, and a voltage detection unit configured to detect an input voltage supplied to the primary side of the transformer, wherein the control unit controls a turn-on time of the first switching element based on the feedback voltage, controls a turn-on time of the second switching element based on detection results of the current detection unit and the voltage detection unit, and performs switching between a continuous control and an intermittent control based on the feedback voltage, the continuous control being a control to perform an operation of continuing the first period, the intermittent control being a control to perform an operation of alternately repeating the first period and the second period.

Further features of the present invention will become apparent from the following description of exemplary embodiments with reference to the attached drawings.

BRIEF DESCRIPTION OF THE DRAWINGS

FIG. 6 is a flowchart illustrating a control of a switching power supply circuit in the embodiment 1.

DESCRIPTION OF THE EMBODIMENTS

Preferred embodiments of the present invention will now be described in detail in accordance with the accompanying drawings.

Hereinafter, modes for carrying out the present invention will be described in detail with embodiments by reference to the drawings.

[Power Supply Apparatus]

Figure 1:
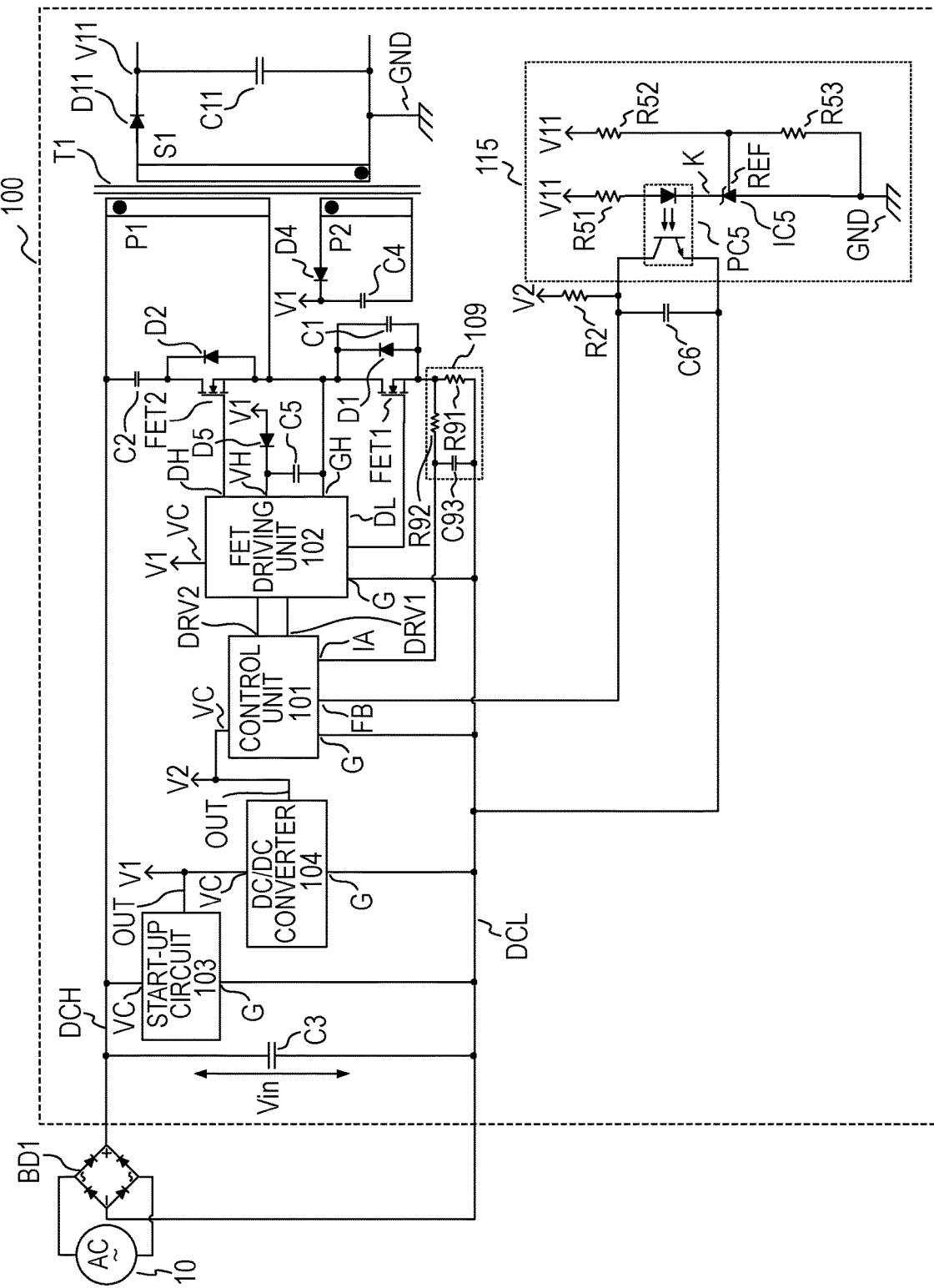
FIG. 1 is a schematic diagram of a power supply circuit in an embodiment 1.

FIG. 1 is a circuit diagram illustrating a schematic construction of a switching power supply circuit using an active clamp system in an embodiment 1. An alternating-current power supply 10, which is a commercial power supply or the like, outputs alternating-current voltage, and the voltage rectified by a bridge diode BD1 as a full-wave rectifying unit is input to a switching power supply circuit 100. A smoothing capacitor C3 is used as a smoothing unit for the rectified voltage. The lower-side potential of the smoothing capacitor C3 is referred to as DCL, and the higher-side potential is referred to as DCH. The switching power supply circuit 100 outputs a power supply voltage V11 to the insulated secondary side, from an input voltage Vin by which the smoothing capacitor C3 is charged. In the embodiment 1, the switching power supply circuit 100 outputs a constant voltage of, for example, 5 V, as an example of the power supply voltage V11.

The switching power supply circuit 100 includes an insulation type transformer T1 having a primary winding P1 and an auxiliary winding P2 on the primary side and having a secondary winding S1 on the secondary side. Energy is supplied from the primary winding P1 of the transformer T1 to the secondary winding S1, by a switching operation described later with FIG. 3A to FIG. 3E. The auxiliary winding P2 of the transformer T1 is used for rectifying and smoothing the forward voltage of the input voltage Vin applied to the primary winding P1 with a diode D4 and a capacitor C4 and supplying the power supply voltage V1.

On the primary side of the switching power supply circuit 100, a field-effect transistor (hereinafter, referred to as a FET) 1 as a first switching element is connected in series with the primary winding P1 of the transformer T1. A capacitor C2 for voltage clamping and a FET 2 as a second switching element are connected in series. The capacitor C2 for voltage clamping and FET 2 connected in series are connected in parallel with the primary winding P1 of the transformer T1. On the primary side of the switching power supply circuit 100, a control unit 101 and a FET driving unit 102 are provided as control units for the FET 1 and the FET 2. A capacitor C1 for voltage resonance, which is connected in parallel with the FET 1, is provided for reducing the loss at the time of switching off the FET 1 and the FET 2. Instead of providing the capacitor C1 for voltage resonance, the capacity between the drain terminal and source terminal of the FET 1 may be used. As the capacitor C1 for voltage resonance, a capacitor having a lower electrostatic capacitance than the capacitor C2 for voltage clamping is selected, for facilitating a later-described operation of turning on the switching element at zero voltage. A diode D1 in the embodiment 1 is a body diode of the FET 1. Similarly, a diode D2 is a body diode of the FET 2.

The secondary side of the switching power supply circuit 100 includes a diode D11 and a capacitor C11. The diode D11 and the capacitor C11 are rectifying and smoothing units on the secondary side for the flyback voltage to be generated in the secondary winding S1 of the transformer T1. The voltage induced in the secondary winding S1 of the transformer T1 is rectified and smoothed by the diode D11 and the capacitor C11, and is output as the power supply voltage V11. The secondary side of the switching power supply circuit 100 includes a feedback unit 115 as a feedback unit for feeding back the information according to the power supply voltage V11 output to the secondary side, to the primary side (the dotted frame part in the figure). The control unit 101 in the embodiment 1 uses a control circuit including a calculation control unit such as a CPU and an ASIC that operates with a clock generated by an oscillator or the like. Thereby, a complex waveform control with a control signal DRV1 and control signal DRV2 described later can be realized by a simple and inexpensive circuit construction. In the embodiment 1, a microcomputer integrally formed as a semiconductor circuit in the control unit 101 is used, and details will be described with FIG. 2.

Between a VC terminal and G terminal of the control unit 101, a power supply voltage V2 generated by a DC/DC converter 104 is supplied from an OUT terminal of the DC/DC converter 104. The control unit 101 outputs the control signal DRV1 and the control signal DRV2, based on a voltage signal input from the feedback unit 115 to an FB terminal, and controls the FET 1 and the FET 2 through the FET driving unit 102. Here, the control signal DRV1 is a signal for driving the FET 1 and the control signal DRV2 is a signal for driving the FET 2. Details of the control unit 101 will be described with FIG. 2.

The FET driving unit 102 is a circuit that generates a gate driving signal DL for the FET 1 in response to the control signal DRV1 input from the control unit 101 and generates a gate driving signal DH for the FET 2 in response to the control signal DRV2. The power supply voltage V1 generated in the auxiliary winding P2 is supplied between a VC terminal and G terminal of the FET driving unit 102. Further, for driving the FET 2, the power supply voltage V1 is supplied between a VH terminal and a GH terminal, by a charge pump circuit constituted by a capacitor C5 and a diode D5. When the control signal DRV1 having a high-level is input, the FET driving unit 102 sets the gate driving signal DL for the FET 1 to a high-level, so that the FET 1 is turned on. Similarly, when the control signal DRV2 having a high-level is input, the FET driving unit 102 sets the gate driving signal DH of the FET 2 to a high-level, so that the FET 2 is turned on.

The DC/DC converter 104 is one of a three-terminal regulator and a step-down type switching power supply circuit. The DC/DC converter 104 converts the power supply voltage V1 input between a VC terminal and a G terminal, and outputs the power supply voltage V2 from an OUT terminal. A start-up circuit 103 is one of a three-terminal regulator and a step-down type switching power supply. The start-up circuit 103 converts the input voltage Vin input between a VC terminal and a G terminal, and outputs the power supply voltage V1 from an OUT terminal. The start-up circuit 103 is a circuit that operates only when the power supply voltage V1 supplied from the auxiliary winding P2 is equal to or lower than a predetermined voltage value, and is used for supplying the power supply voltage V1 at the start-up of the switching power supply circuit 100.

(Control Unit 101)

Figure 2:
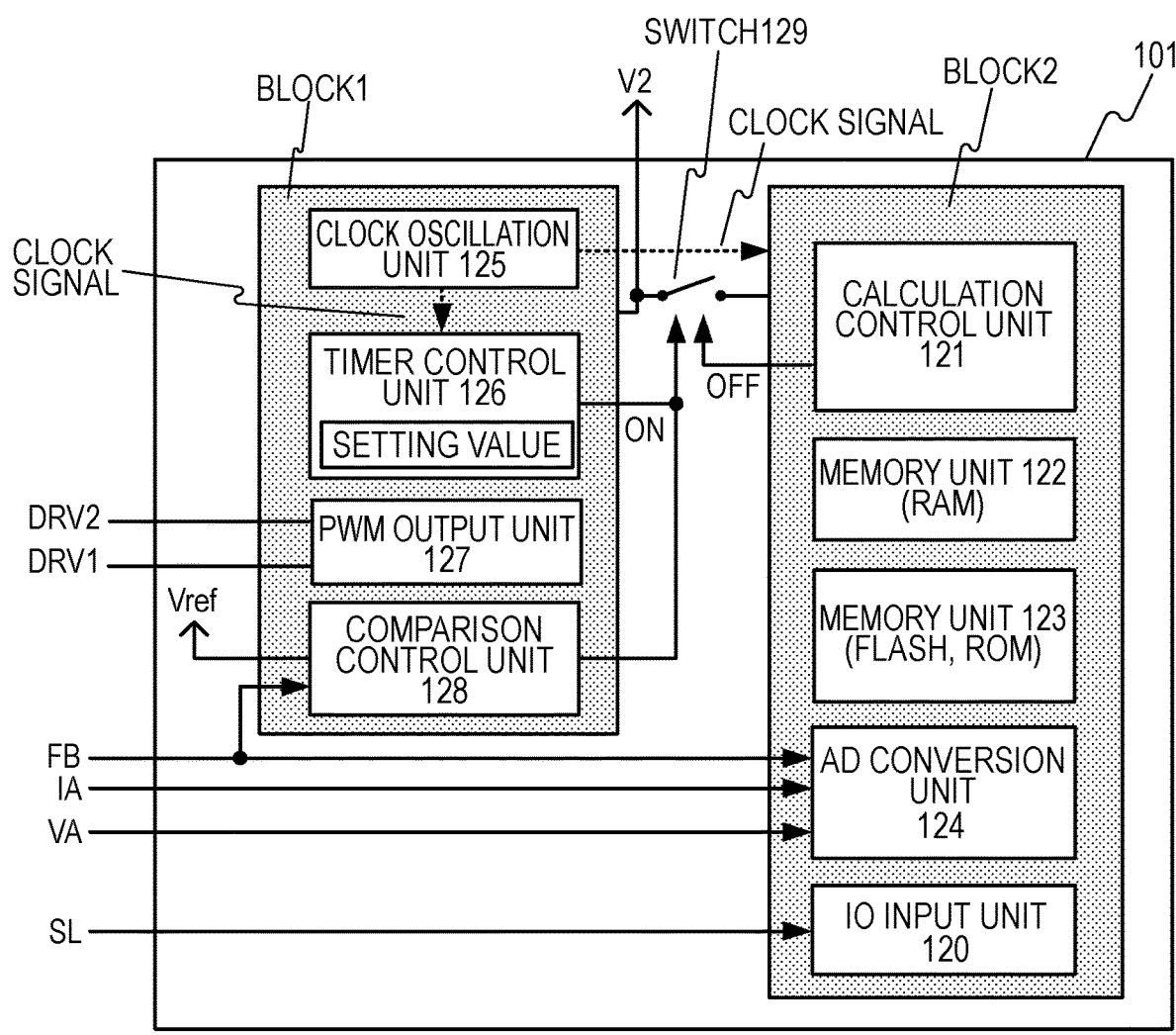
FIG. 2 is a functional block diagram of a control unit 101 in embodiments 1 and 2.

FIG. 2 illustrates a schematic diagram of a circuit construction of the control unit 101 that can be applied to the embodiment 1 to an embodiment 3. The control unit 101 is divided into a block 1 and a block 2. The block 1 includes a clock oscillation unit 125, a timer control unit 126, a PWM output unit 127, and a comparison control unit 128. The block 2 includes a calculation unit 121, a memory unit 122 such as a RAM, a memory unit 123 such as a FLASH and a ROM, and an AD conversion unit 124. The control unit 101 is a microcomputer formed by an integrated circuit on one chip.

The calculation unit 121, which operates based on a clock signal from the clock oscillation unit 125, is a control unit that reads the instructions and data stored in the memory unit 123, into the memory unit 122, and then performs sequential calculation. The calculation unit 121 controls setting values (control start timing, period, duty) of the control signals DRV1, DRV2 that are output waveforms of the PWM output unit 127, based on a later-described FB terminal voltage detected by the AD conversion unit 124. Thereby, the calculation unit 121 controls the FET 1 and the FET 2. The AD conversion unit 124 detects voltage values of a later-described IA terminal voltage and VA terminal voltage, similarly. The VA terminal voltage is used in the control of the switching power supply circuit 100.

The timer control unit 126 is a timer that is used for controlling the length of the minimum stop period in an intermittent control, which will be described with FIG. 3A to FIG. 3E. The comparison control unit 128 is a circuit for comparing the later-described FB terminal voltage and a predetermined comparison voltage Vref, and is used in the intermittent control, which will be described with FIG. 3A to FIG. 3E. The comparison voltage Vref is a reference voltage generated within the control unit 101. An IO input unit 120 detects the condition of a high-level or low-level of a later-described SL terminal voltage. The SL terminal voltage is used in the control of the switching power supply circuit 100.

The control unit 101 includes a switch 129 for power saving, and has a power saving mode for reducing power consumption by stopping the supply of the power supply voltage V2 to the block 2. The switch 129 for power saving is used for reducing the power consumption of the control unit 101 during the switching stop period in the later-described intermittent control.

For returning from the power saving mode of the control unit 101 and restarting the control of the calculation unit 121 disposed in the block 2 in the later-described intermittent control, the switch 129 for power saving is turned on in the following cases. For example, the switch 129 for power saving is turned on, when the timer control unit 126 detects the elapse of a later-described minimum stop period Tmin. Further, for example, the switch 129 for power saving is turned on, when the comparison control unit 128 detects that the later-described FB terminal voltage exceeds the later-described reference voltage Vref (FBL2).

The power consumption of the block 2 may be reduced by stopping the clock signal to be supplied to the block 2, instead of stopping the supply of the power supply voltage V2 to the block 2 using the switch 129.

(Current Detection Unit)

The description returns to FIG. 1. A current detection unit 109 as a current detection unit will be described. The current detection unit 109 is used for detecting the average current value that flows through the FET 1. The current detection unit 109 includes a resistor R91 as a current detection resistor for the current that flows through the FET 1. The voltage value detected by the resistor R91 is smoothed by a resistor R92 and a capacitor C93, and is input to an IA terminal of the control unit 101. The control unit 101 detects the voltage input to the IA terminal (hereinafter, referred to as an IA terminal voltage). The average current value that flows through the FET 1 is proportional to the load of the switching power supply circuit 100. Therefore, the control unit 101 can detect the load of the switching power supply circuit 100, based on the IA terminal voltage output from the current detection unit 109.

(Feedback Unit)

The feedback unit 115 is used for controlling the power source voltage V11 to a predetermined constant voltage. The voltage value of the power supply voltage V11 is set by a reference voltage of a reference terminal REF of a shunt regulator IC5, a resistor R52 and a resistor R53. When the power supply voltage V11 becomes equal to or higher than a predetermined voltage (5 V in the embodiment), current flows from a cathode terminal K of the shunt regulator IC5, and a secondary-side diode of a photo-coupler PC5 becomes a conduction condition through a pull-up resistor R51. Thereby, a primary-side transistor of the photo-coupler PC5 operates, so that charges are discharged from a capacitor C6. Therefore, the voltage of the FB terminal (hereinafter, referred to as an FB terminal voltage) of the control unit 101 decreases. On the other hand, when the power supply voltage V11 becomes lower than 5 V, the secondary-side diode becomes a non-conduction condition. Thereby, the primary-side transistor of the photo-coupler PC5 is turned off, and the current for charging the capacitor C6 flows through a resistor R2 by the power supply voltage V2. Therefore, the FB terminal voltage of the control unit 101 rises. In this way, the feedback unit 115 changes the FB terminal voltage of the control unit 101, according to the variation in the power supply voltage V11.

By detecting the FB terminal voltage input from the feedback unit 115, the control unit 101 performs a feedback control for controlling the power supply voltage V11 to a predetermined constant voltage. In this way, the control unit 101 can perform the feedback control for the power supply voltage V11, by monitoring the FB terminal voltage. The embodiment 1 is characterized by using a method of detecting the light load condition of the switching power supply circuit 100 using the FB terminal voltage of the control unit 101. The detection method for the light load condition using the FB terminal voltage will be described with FIGS. 5A to 5C.

[Control Method for Light Load Condition of Switching Power Supply Circuit]

Figure 3:
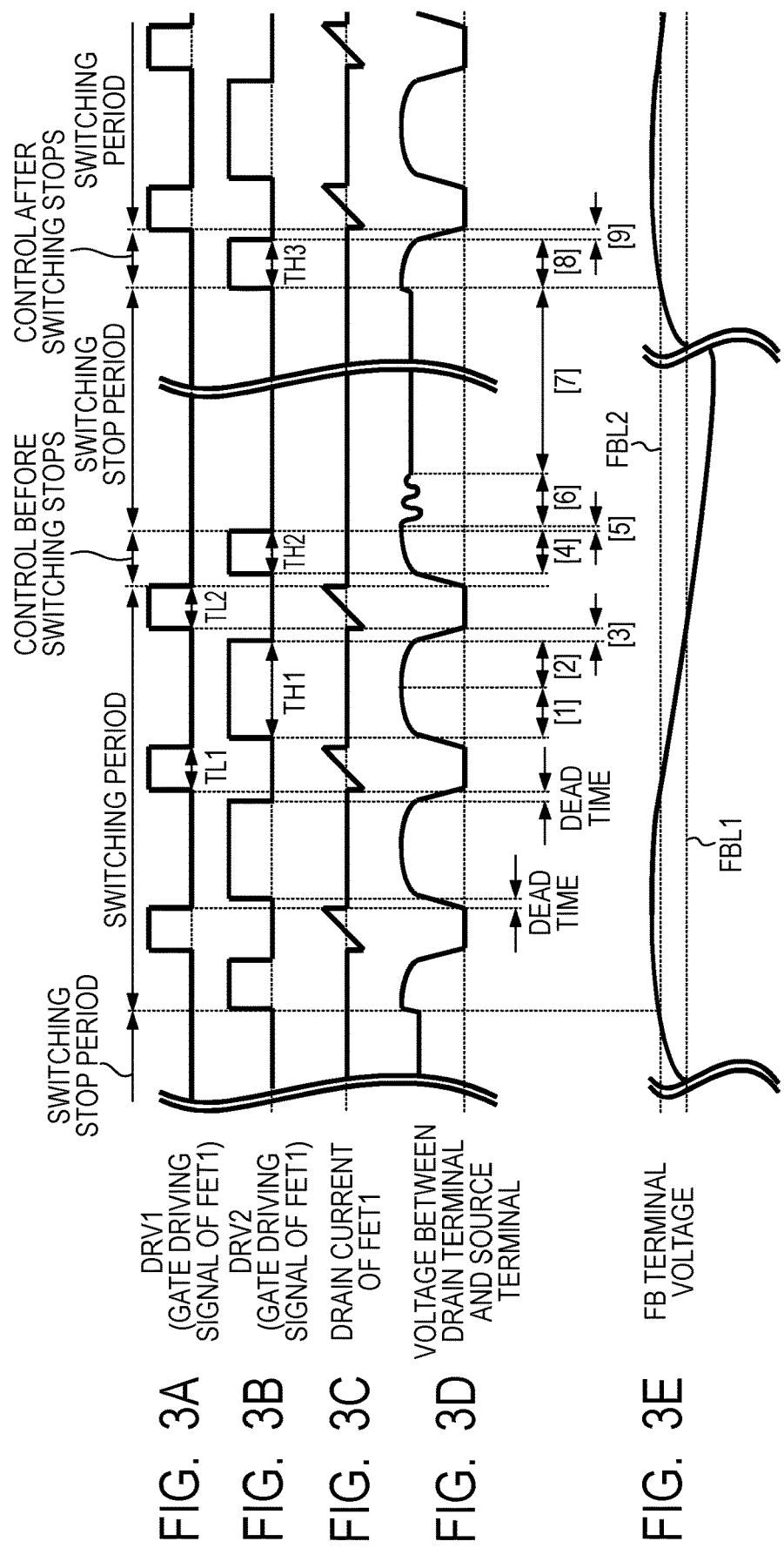
FIGS. 3A, 3B, 3C, 3D, and 3E are explanatory diagrams of a control method in the embodiment 1.
Figure 4:
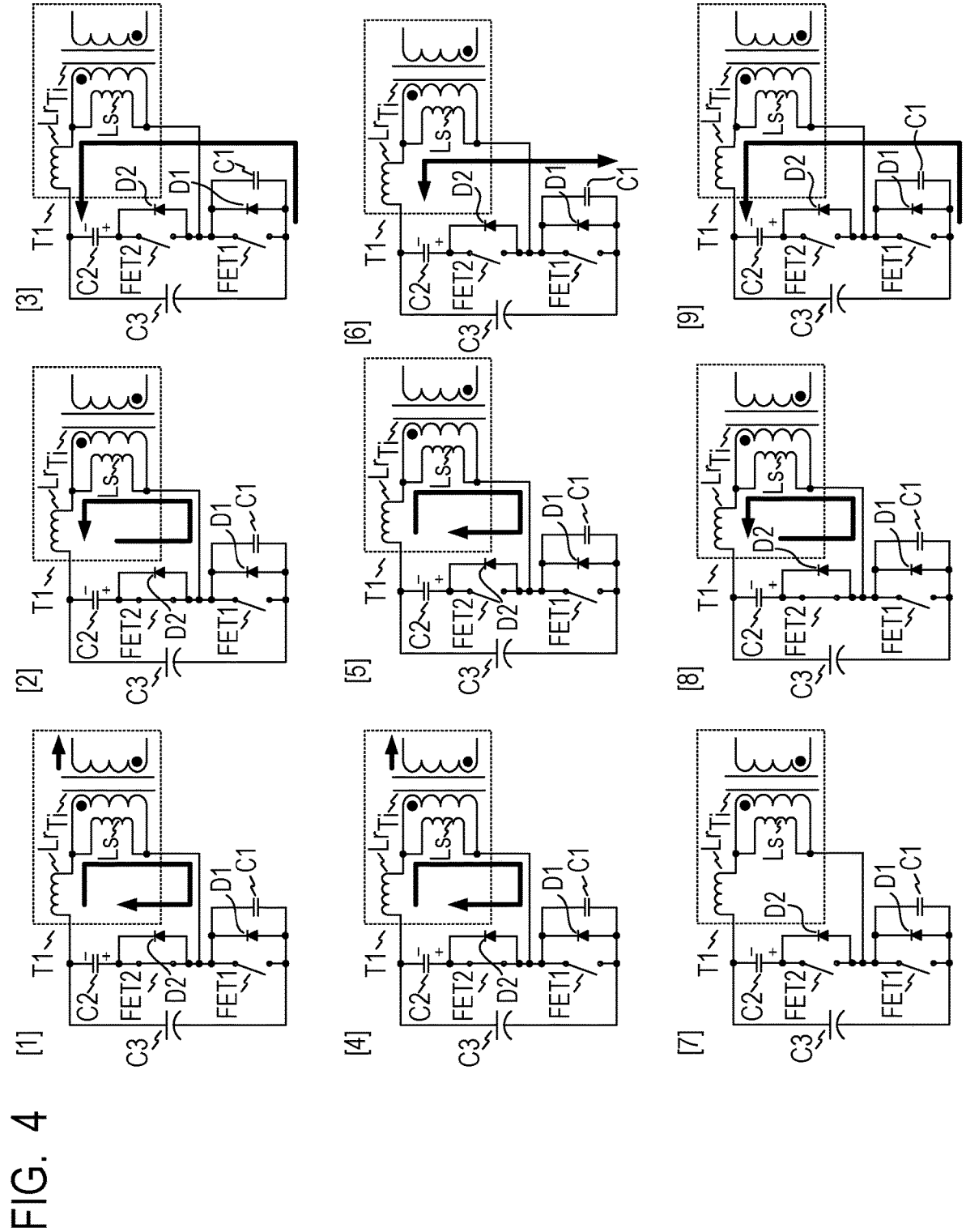
FIG. 4 is a simplified circuit diagram for describing the control method in the embodiment 1.

FIG. 3A to FIG. 3E are explanatory diagrams of a control method of improving the efficiency of the light load condition of the switching power supply circuit 100 using the active clamp system with the control unit 101. FIG. 3A is a diagram illustrating the control signal DRV1 corresponding to the gate driving signal DL of the FET 1, and FIG. 3B is a diagram illustrating the control signal DRV2 corresponding to the gate driving signal DH of the FET 2. FIG. 3C is a diagram illustrating the drain current of the FET 1, FIG. 3D is a diagram illustrating the voltage between the drain terminal and source terminal of the FET 1, and FIG. 3E is a diagram illustrating the FB terminal voltage. Each abscissa axis indicates time. FIG. 4 illustrates current flows in a plurality of periods ([1] to [9]) illustrated in FIG. 3A to FIG. 3E, with a simplified circuit diagram. In the following, operations in the periods will be described. In FIG. 4, the transformer T1 is illustrated while being divided into a leakage inductance Lr, a coupled inductance Ls and an ideal transformer T1. In the circuits in FIG. 4, the currents flowing in the periods are illustrated as dark solid arrows. In the embodiment 1, the period of the control of the FET 1 and the FET 2 is divided into a switching period as a first period, a period of execution of a control before the switching stops, a switching stop period as a second period and a period of execution of a control after the switching stops. Here, a control to perform an operation of continuing the first period is referred to as a continuous control, and a control to perform an operation of alternately repeating the first period and the second period is referred to as an intermittent control.

(Switching Period)

The switching period in FIG. 3A to FIG. 3E is a period in which the control unit 101 performs a repeat control by alternately turning on or turning off the FET 1 and the FET 2 before and after a dead time in which both the FET 1 and the FET 2 are in the turn-off condition. An operation using the FET 2 and the capacitor C2 for voltage clamping in the switching period (hereinafter, referred to as an active clamp operation) will be described with FIG. 3A to FIG. 3E and [1] to [3] in FIG. 4.

While the FET 1 is in the turn-on condition, current flows through the leakage inductance Lr and coupled inductance Ls of the transformer T1 (see FIG. 3C). The period of [1] illustrated in FIG. 4 is a period in which the FET 2 is in the turn-on condition after the FET 1 is in the turn-on condition for a time TL1 and then becomes the turn-off condition and the dead time elapses. With the current that flows while the FET 1 is in the turn-on condition, a plus terminal side of the capacitor C2 for voltage clamping is charged from the transformer T1 through one of the FET 2 and the diode D2. The kickback voltage from the leakage inductance Lr can be absorbed by the capacitor C2 for voltage clamping, allowing the suppression of the surge voltage that is applied between the drain terminal and source terminal of the FET 1. When the voltage of the capacitor C2 for voltage clamping rises, the diode D11 is turned on, so that electric power is supplied to the secondary side of the switching power supply circuit 100 through the secondary winding S1 of the transformer T1.

In the period of [2] illustrated in FIG. 4, current flows from the plus terminal side of the capacitor C2 to the transformer T1 through the FET 2, by the resonance between the capacitor C2 for voltage clamping and the leakage inductance Lr and coupled inductance Ls of the transformer T1. When the voltage of the capacitor C2 for voltage clamping decreases, the diode D11 on the secondary side becomes the non-conduction condition, so that electric power is not supplied to the secondary side of the switching power supply circuit 100. Furthermore, by keeping the conduction condition of the FET 2, the current to flow from the capacitor C2 for voltage clamping to the leakage inductance Lr and coupled inductance Ls of the transformer T1 increases.

The period of [3] illustrated in FIG. 4 is a dead time period in which both the FET 1 and the FET 2 are in the turn-off condition. In the period of [3] in FIG. 4, because of the turn-off condition of the FET 2, the capacitance of the capacitor connected with the primary winding P1 of the transformer T1 decreases from the value of the combined capacitance of the capacitor C2 for voltage clamping and the capacitor C1 for voltage resonance to the capacitance of the capacitor C1 for voltage resonance. Therefore, by the current that flows through the leakage inductance Lr and coupled inductance Ls of the transformer T1, the charges contained in the capacitor C1 for voltage resonance can be regenerated to the smoothing capacitor C3. When the above-described regeneration operation finishes, the diode D1 becomes the conduction condition. The period of [3] illustrated in FIG. 4 finishes, and while the diode D1 is in the conduction condition, the FET 1 is turned on, so that the FET 1 can perform a switching operation of transitioning from the turn-off condition to the turn-on condition at zero volt. Hereinafter, the switching operation in which the FET 1 transitions from the turn-off condition to the turn-on condition at zero volt is referred to as a zero-volt switching. Such an operation after the FET 2 becomes the turn-on condition and before the operation of the regeneration to the smoothing capacitor C3 finishes is referred to as an active clamp operation. Thereafter, the FET 1 is in the turn-on condition for a time TL2.

In this way, the surge voltage of the FET 1 can be suppressed by the actions of the capacitor C2 for voltage clamping and the FET 2 in the active clamp operation described with FIG. 3A to FIG. 3E and [1] to [3] in FIG. 4. Further, the charges in the capacitor C1 for voltage resonance can be regenerated to the smoothing capacitor C3, and furthermore, the zero-volt switching of the FET 1 can be performed. Accordingly, by using the active clamp system, the efficiency of the switching power supply circuit 100 can be improved in the switching period illustrated in FIG. 3A to FIG. 3E.

(Intermittent Operation)

Next, an intermittent operation of alternately repeating the above-described switching period and the later-described switching stop period will be described. When the control in the switching period is continued with no change in the light load condition of the switching power supply circuit 100, the following problem arises. That is, the efficiency of the switching power supply circuit 100 decreases due to a resistance loss by the current on the primary side of the switching power supply circuit 100 and a switching loss of the FET 1 and the FET 2.

Therefore, in the light load condition, the switching power supply circuit 100 performs the intermittent operation of repeating the switching period and the later-described switching stop period. Thereby, the current on the primary side of the switching power supply circuit 100 and the number of switching times of the FET 1 and the FET 2 are reduced, allowing the improvement in the power efficiency of the switching power supply circuit 100 in the light load condition.

For realizing the intermittent operation, the switching power supply circuit 100 detects that the switching power supply circuit 100 is in the light load condition, when the FB terminal voltage from the feedback unit 115 falls below a predetermined threshold voltage FBL1. Then, after the later-described control before the switching stops, the switching power supply circuit 100 transitions to the switching stop period. The switching stop period finishes when the FB terminal voltage becomes higher than a predetermined threshold FBL2 (the reference voltage Vref of the control unit 101).

When the frequency in the intermittent control becomes high, a high-frequency sound is generated. For preventing the high-frequency sound, the switching stop period is continued at least until the switching stop period exceeds the minimum stop period Tmin, by the control of the timer control unit 126 described in FIG. 6.

(Period of Execution of Control Before Switching Stops)

Next, the control before the switching stops, which is performed in the period of [4] illustrated in FIG. 4, will be described. Turn-on times of the FET 1 in the switching period are referred to as TL1 and TL2, and a turn-on time of the FET 2 is referred to as TH1. Further, a turn-on time of the FET 2 in the period of the execution of the control before the switching stops is referred to as TH2, and a turn-on time of the FET 1 before the turn-on time of the FET 2 becomes TH2 is referred to as TL2 (see FIG. 3A to FIG. 3E). Furthermore, a turn-on time of the FET 2 in the period of the execution of the control after the switching stops is referred to as TH3 (the period of [8] described later).

The operation in the period of [4] illustrated in FIG. 4 is the same as the above-described operation in the period of [1]. In the embodiment 1, the FET 2 is in the turn-on condition for a time shorter than a time for which the switching stop period continues. Further, the FET 2 is in the turn-on condition for a time (TH2) shorter than the time (TH1) for which the FET 2 is in the turn-on condition in the switching period (TH2<TH1). Furthermore, the FET 2 is in the turn-on condition for a time equal to or shorter than half of the time (TH1) for which the FET 2 is in the turn-on condition in the switching period (TH2≤TH1/2). In this way, the embodiment 1 is characterized in that the turn-on time TH2 (the period of [4]) of the FET 2 in the period of the execution of the control before the switching stops is shorter than the turn-on time TH1 (the sum of the periods of [1] and [2]) of the FET 2 in the switching period. In the period of the execution of the control before the switching stops in the embodiment 1, the ratio of the turn-on times of the FET 1 and the FET 2 is controlled so as to be a ratio (the ratio of TL2 and TH2) equal to or lower than half of the ratio (the ratio of TL1 and TH1) of the turn-on times in the switching period. As a similar control method of shortening the turn-on time of the FET 2, it is allowable to use a method of controlling the turn-on time (TH2) of the FET 2 to a time (TH2≤TH1/2) equal to or shorter than half of the turn-on time (TH1) of the FET 2 at the last turn-on in the switching period.

In this way, the optimal turn-on time (TH2) of the FET 2 at the time of the control before the switching stops is determined from the ratio (the ratio of TL1 and TH1) of the turn-on times of the FET 1 and the FET 2 in the switching period. Thereby, before current flows from the plus terminal side of the capacitor C2 for voltage clamping to the transformer T1 (the period of [2] in FIG. 4), the FET 2 is turned off, allowing the transition to the switching stop period, more specifically, to the condition after [5]. In the embodiment 1, the turn-on time (TH2) of the FET 2 at the time of the control before the switching stops is determined, as described later for the periods of [5] to [6]. Thereby, without providing a dedicated detection unit, the switching power supply circuit 100 can transition to the switching stop period, while the capacitor C2 for voltage clamping is charged at the peak voltage in the resonance of the transformer T1 and the capacitor C2 for voltage clamping (see FIG. 3D). Therefore, the efficiency of the switching power supply circuit 100 can be improved.

The operation in the period of [5] illustrated in FIG. 4 is shown as follows. The current having not been used for the charge of the capacitor C2 for voltage clamping from the transformer T1 in the period of [4] is made flow to the capacitor C2 for voltage clamping through the capacitor C1 for voltage resonance and the diode D2, so that the capacitor C2 for voltage clamping is further charged. The plus terminal side of the capacitor C2 for voltage clamping is charged from the transformer T1 at the peak voltage in the resonance of the transformer T1, the capacitor C2 for voltage clamping and the capacitor C1 for voltage resonance, and thereafter, the switching power supply circuit 100 transitions to the condition of [6].

In the period of [6] illustrated in FIG. 4, because of the turn-off condition of the FET 1 and the FET 2, current does not flow from the plus terminal side of the capacitor C2 for voltage clamping to the transformer T1. Therefore, the capacitor C2 for voltage clamping can be kept at the peak voltage in the above-described resonance. In this condition, the resonance operation (illustrated as a double-headed arrow in FIG. 4) of the capacitor C1 for voltage resonance and the transformer T1 occurs (see FIG. 3D). Since the capacitance of the capacitor C1 for voltage resonance is low, the resonance operation occurs at a higher frequency than the frequency in the switching period, and the amplitude of the resonance operation is attenuated in a relatively short time, due to the loss by the resistance component (FIG. 3D).

(Switching Stop Period)

Next, a control in the switching stop period illustrated in FIG. 3A to FIG. 3E will be described. In the period of [7] illustrated in FIG. 4, the FET 1 and the FET 2 are kept in the turn-off condition, while the voltage of the capacitor C2 for voltage clamping is kept (FIG. 3D). Since the voltage of the capacitor C2 for voltage clamping is kept, even after the elapse of a predetermined stop period, current flows from the plus terminal side of the capacitor C2 to the transformer T1 (the condition of [2] in FIG. 4), by turning the FET 2 on. The control unit 101 finishes the switching stop period, when the control unit 101 detects the FB terminal voltage output from the feedback unit 115 or a condition in which electric power should be supplied to the load on the secondary side of the switching power supply circuit 100 or when a predetermined time elapses based on the timer control unit 126. Then, after performing a later-described control after the switching stops, the control unit 101 transition to the switching period.

(Period of Execution of Control after Switching Stops)

Next, a control after the switching stops in [8] to [9] illustrated in FIG. 4 will be described. The operation in the period of [8] illustrated in FIG. 4 is the same as the above-described operation in the period of [2], but the period of [8] illustrated in FIG. 4 is characterized by shortening the turn-on time of the FET 2. In the embodiment 1, the FET 2 is in the turn-on condition for a time shorter than the time for which the switching stop period continues. Further, the FET 2 is in the turn-on condition for a time shorter than the time (TH1) for which the FET 2 is in the turn-on condition in the switching period. Furthermore, the FET 2 is in the turn-on condition for a time (<TH1/2) shorter than half of the time (TH1) for which the FET 2 is in the turn-on condition in the switching period. In the control in the embodiment 1, the ratio of the turn-on times of the FET 1 and the FET 2 is controlled so as to be a ratio (the ratio of TL2 and TH3) lower than half of the ratio (the ratio of TL1 and TH1) of the turn-on times in the switching period.

Furthermore, the turn-on time TH3 of the FET 2 may be set to a time (TH3<TH2) shorter than the turn-on time TH2 of the FET 2 in the control before the switching stops. In this case, for the turn-on time (TH3) of the FET 2, a relation of "TH1/2≥TH2>TH3" is satisfied. By shortening the turn-on time of the FET 2 in the period of [8], the efficiency of the switching power supply circuit 100 is improved. That is, it is possible to prevent a needless increase in the current that flows from the capacitor C2 for voltage clamping to the leakage inductor Lr and coupled inductance Ls of the transformer T1, so that the efficiency of the switching power supply circuit 100 is improved.

In the period of [9] subsequently illustrated in FIG. 4, which is a dead time period, the FET 1 and the FET 2 is in the turn-off condition similarly to the period of [3]. By turning the FET 1 on after the elapse of the dead time period of [9] in FIG. 4, the FET 1 can perform the zero-volt switching, similarly to the description of the period of [3].

In the intermittent operation in the embodiment 1, the switching period described in FIG. 3A to FIG. 3E and [1] to [3] in FIG. 4, the control before the switching stops described in [4], the switching stop period described in [5] to [7] and the control after the switching stops described in [8] to [9] are repeated. On this occasion, there is provided a sufficiently long switching stop period with respect to the turn-on times TH2, TH3 of the FET 2 in the control before the switching stops and the control after the switching stops. Thereby, the current on the primary side of the switching power supply circuit 100 and the number of switching times of the FET 1 and the FET 2 are reduced, allowing the improvement in the power efficiency of the switching power supply circuit 100 in the light load condition.

(Control Method for Power Supply Voltage V11)

Figure 5A:
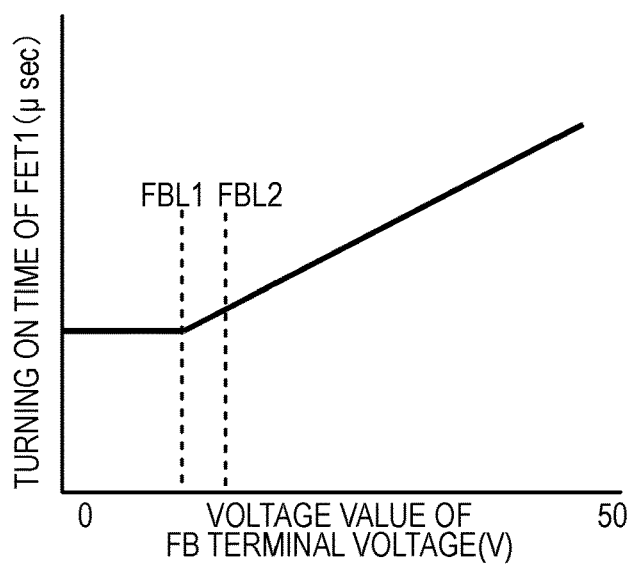
FIGS. 5A, 5B, and 5C are explanatory diagrams of a feedback control method in the embodiment 1.

A control method for the power supply voltage V11 on the secondary side when the switching period is continued illustrated in FIG. 5A to FIG. 5C will be described. The control for the power supply voltage V11 on the secondary side of the switching power supply circuit 100 is performed by changing the ratio of the turn-on times of the FET 1 and the FET 2. The increase in the ratio of the turn-on time of the FET 1 to the turn-on time of the FET 2 raises the power supply voltage V11 on the secondary side. As the method of controlling the ratio of the turn-on times of the FET 1 and the FET 2, it is allowable to use a method of making the turn-on time of the FET 1 changeable based on the feedback information output from the feedback unit 115, that is, the FB terminal voltage, as illustrated in FIG. 5A. FIG. 5A indicates the voltage value (V) of the FB terminal voltage on the abscissa axis, and indicates the turn-on time (μsec (microsecond)) of the FET 1 on the ordinate axis. Further, the threshold voltages FBL1, FBL2 indicated in FIG. 3E are also indicated by broken lines. In FIG. 5A, the turn-on time of the FET 1 is increased in proportion to the FB terminal voltage, until the FB terminal voltage falls below the threshold voltage FBL1. Then, when the FB terminal voltage falls below the threshold voltage FBL1, the turn-on time of the FET 1 is kept constant. When the turn-on time of the FET 1 is excessively shortened at the time of a light load, the efficiency decreases, and therefore, a lower limit value is provided for the turn-on time of the FET 1.

(Detection Method for Light Load Condition)

In the embodiment 1, whether the load of the power supply is large is detected based on the IA terminal voltage output from the current detection unit 109. FIG. 5B indicates the value (converted into the current value (A)) of the IA terminal voltage on the abscissa axis, and indicates the turn-on time (μsec) of the FET 2 on the ordinate axis. As illustrated in FIG. 5B, when the control unit 101 detects the increase in the load of the power supply, that is, when the current value corresponding to the IA terminal voltage increases, the control unit 101 performs a control to increase the turn-on time of the FET 2. By detecting the increase in the load and performing the control to increase the turn-on time of the FET 2 in this way, the turn-on time of the FET 1 is increased such that the output voltage V11 is kept at a predetermined target voltage. FIG. 5C indicates the value (converted into the current value (A)) of the IA terminal voltage on the abscissa axis, and indicates the voltage value (V) of the FB terminal voltage on the ordinate axis. Further, the threshold values FBL1, FBL2 are also indicated by broken lines. As illustrated in FIG. 5C, when the current value corresponding to the IA terminal voltage increases, the FB terminal voltage rises. When the FB terminal voltage falls below the threshold voltage FBL1, the switching power supply circuit 100 transitions to the intermittent control, and the FB terminal voltage does not decrease any further. Therefore, in the graph in FIG. 5C, the voltage is illustrated by a broken line. The broken line part in FIG. 5C illustrates the FB terminal voltage on the assumption that the intermittent control is not performed.

Figure 5B:
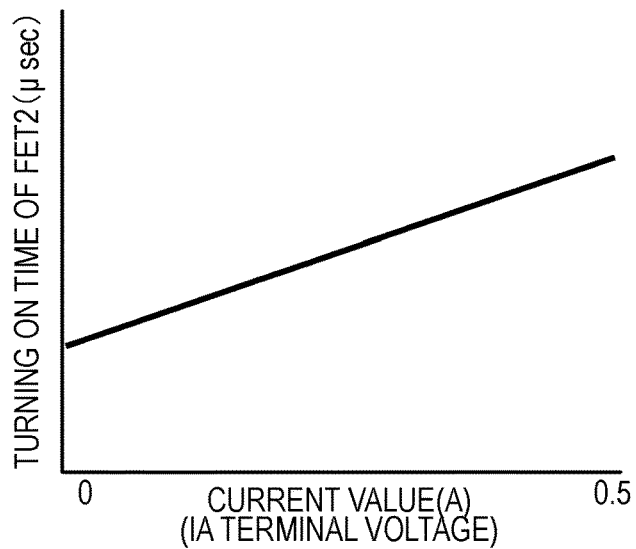
Figure 5C:
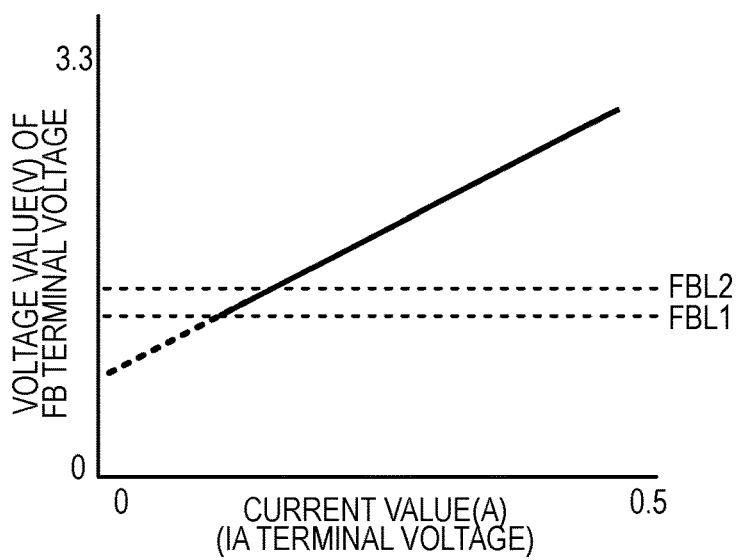

As seen from FIG. 5B and FIG. 5C, when the turn-on time of the FET 2 is increased, the FB terminal voltage rises. That is, by performing the control to increase the turn-on time of the FET 2 based on the load of the switching power supply circuit 100, the FB terminal voltage rises at the time of a heavy load of the switching power supply circuit 100, and the FB terminal voltage decreases at the time of a light load. When the load of the switching power supply circuit 100 is reduced and the FB terminal voltage decreases to the FBL1 as illustrated in FIG. 5C, the control unit 101 determines the light load condition, and transitions to the switching stop period in the intermittent control described with FIG. 3A to FIG. 3E.

(Efficiency Improvement Effect 1 in Light Load Condition)

Here, the effect of the detection method for the light load condition using the FB terminal voltage, which is a characteristic of the embodiment 1, will be described. In the switching power supply circuit 100, the turn-on time of the FET 1 may be controlled based on the FB terminal voltage, while the turn-on time of the FET 2 is fixed, or the turn-on duty of the FET 1 may be controlled based on the FB terminal voltage. In such a case, the variation amount of the FB terminal voltage due to the variation in the load of the power supply is a small value. When the load increases, the FB terminal voltage slightly rises by an amount for making up for the decrease in the output voltage V11. Therefore, in consideration of the variability of the circuit and the like, it is difficult to determine the light load condition using the FB terminal voltage. Hence, the control described with FIG. 5A to FIG. 5C, that is, the control of the turn-on time of the FET 2 based on the IA terminal voltage is performed. This facilitates the determination of the light load condition based on the FB terminal voltage. Further, it is possible to surely perform the intermittent control in the light load condition of the switching power supply circuit 100, and to improve the power supply efficiency of the switching power supply circuit 100.

(Efficiency Improvement Effect 2 in Light Load Condition)

Furthermore, as the effect to be obtained by using the detection method in the light load condition using the FB terminal voltage, which is a characteristic of the embodiment 1, it is possible to obtain an effect of the reduction in the power consumption of the control unit 101 in the light load condition as described below. As the control unit for realizing the intermittent control of the switching power supply circuit 100, a method of controlling the switching period and the switching stop period can be used. In this method, one of the overshoot and undershoot of the FB terminal voltage is used as illustrated in FIG. 3A to FIG. 3E.

As described in FIG. 3A to FIG. 3E, the switching stop period in the intermittent control is started when the FB terminal voltage becomes lower than the predetermined threshold voltage FBL1. Further, the detected threshold voltages are fixed values (FBL1, FBL2). Therefore, in the case of performing a control to stop the switching stop period in the intermittent control when the FB terminal voltage becomes higher than the predetermined threshold voltage FBL2, it is possible to detect the predetermined threshold voltages (FBL1, FBL2), using the comparison control unit 128 of the control unit 101. Particularly, in the switching stop period, as described above, the switch 129 for power saving is turned off, and the power consumption of the block 2 of the control unit 101 can be reduced. Therefore, the method of detecting the threshold voltage FBL2 with the comparison control unit 128 is effective. The switching power supply circuit 100 in the embodiment 1 detects the threshold voltage FBL1, using the AD conversion unit 124. Therefore, by determining that the FB terminal voltage becomes higher than the threshold voltage FBL2 in the switching stop period using the comparison control unit 128 having a low power consumption, it is possible to reduce the power consumption of the control unit 101, and to improve the power supply efficiency at the time of the light load.

Even by a method of using the AD conversion unit 124 and the calculation unit 121 instead of the comparison control unit 128, it is possible to detect that the FB terminal voltage becomes higher than the threshold voltage FBL2 in the switching stop period. However, as described above, in the case of operating the AD conversion unit 124 and the calculation unit 121, the power consumption of the control unit 101 is larger than in the case of operating the comparison control unit 128.

Further, in the case of performing the intermittent control while determining the light load condition based on the IA terminal voltage output by the current detection unit 109 without using the FB terminal voltage for the determination of the light load condition, the FB terminal voltage at the time of the transition to the intermittent control is not a fixed value. Therefore, the control using the comparison control unit 128 cannot be performed.

[Control of Switching Power Supply Circuit]

FIG. 6 is a flowchart describing a control process of the switching power supply circuit 100 by the control unit 101 in the embodiment 1. When the alternating-current power supply 10 is connected with the switching power supply circuit 100 and electric power is supplied to the switching power supply circuit 100, the control unit 101 starts the following control.

In step (hereinafter, abbreviated as "S") 302, the control unit 101 controls the turn-on time of the FET 1, according to the FB terminal voltage input from the feedback unit 115 to the FB terminal. For example, the control unit 101 controls the drive of the FET 1 such that the turn-on time of the FET 1 is TL1 or TL2. In S303, the control unit 101 determines whether the FB terminal voltage is lower than the predetermined threshold voltage FBL1 (FB<FBL1), for determining whether the switching power supply circuit 100 is in the light load condition. Here, the predetermined threshold voltage FBL1 to be used for determining whether the switching power supply circuit 100 is in the light load condition is referred to as a stop voltage, hereinafter. In S303, in the determining that the FB terminal voltage is equal to or higher than the stop voltage FBL1, the control unit 101 advances the process to S304. In S304, the control unit 101 determines the turn-on time of the FET 2 based on the time according to the IA terminal voltage, as described in FIG. 5B, and returns the process to S302. For example, the control unit 101 controls the drive of the FET 2 such that the turn-on time of the FET 2 is TH1. The control unit 101 stores the turn-on time (for example, TH1) of the FET 2 in the switching period, in the memory unit 122 such as the RAM included in the interior. The control unit 101 performs the control so as to provide the above-described predetermined dead time between the turn-on time of the FET 1 and the turn-on time of the FET 2. In this case, since the switching power supply circuit 100 is not in the light load condition, the control unit 101 performs the continuous operation of continuously executing the switching period.

In the case of determining that the FB terminal voltage is lower than the stop voltage FBL1 in S303, the control unit 101 advances the process to S305. In S305, the control unit 101 controls the turn-on time of the FET 2, such that the turn-on time (TH2) of the FET 2 is a time (TH2≤TH1/2) equal to or shorter than one-half (half) of the turn-on time (TH1) according to the IA terminal voltage. This control corresponds to the above-described control before the switching stops. After the elapse of the turn-on time (TH2) of the FET 2 determined in S305, the control unit 101, in S306, turns the FET 1 and the FET 2 off, and keeps the turn-off condition. The control unit 101 turns the switch 129 off, with the calculation unit 121. This control corresponds to the above-described control in the switching stop period. The control unit 101 resets and starts the timer control unit 126.

In S307, the control unit 101 determines whether the FB terminal voltage is higher than the predetermined threshold voltage FBL2, using the comparison control unit 128, for detecting whether the electric power to be supplied as the power supply voltage V11 on the secondary side of the switching power supply circuit 100 is insufficient. Here, the predetermined threshold voltage FBL2 to be used for determining the transition from the switching stop period to the switching period is referred to as a return voltage, hereinafter. The relation between the stop voltage FBL1 and the return voltage FBL2 is set to FBL2>FBL1, for hysteresis. In the embodiment 1, since the minimum stop period Tmin based on the timer control unit 126 is provided, the intermittent control can be performed even in the case of FBL2=FBL1.

As described above, in the switching stop period (the period in which the processes of S307 and S308 are repeated), the switch 129 of the control unit 101 is in the turn-off condition, so that the power consumption of the control unit 101 is reduced. When the process of S309 is started, the switch 129 is turned on by one of the comparison control unit 128 and the timer control unit 126.

In the case of determining that the FB terminal voltage is higher than the return voltage FBL2 in S307, the control unit 101 advances the process to S308. In the case of determining that the FB terminal voltage is equal to or lower than the return voltage FBL2 in S307, the control unit 101 continues the switching stop period, and repeats the process of S307. In S308, the control unit 101 determines whether the length of the switching stop period started in the process of S306 is longer than the predetermined minimum stop period Tmin stored in the setting value (memory) of the timer control unit 126 of the control unit 101. At the time of the determination in S308, the control unit 101 refers to the timer control unit 126. The minimum stop period Tmin is calculated by the control unit 101, and is stored as the setting value of the timer control unit 126. The minimum stop period Tmin is calculated such that the period of the intermittent control (the total period of the switching period and the stop period) is not shorter than a predetermined period.

In the case of determining that the switching stop period is longer than the minimum stop period Tmin in S308, the control unit 101 advances the process to S309. In the case of determining that the switching stop period is equal to or shorter than the minimum stop period Tmin in S308, the control unit 101 repeats the process of S308, and continues the switching stop period. In this way, in the embodiment 1, the determination of the return from the switching stop period to the switching period is performed based on the FB terminal voltage and the predetermined time elapse. However, the determination of the return from the switching stop period to the switching period may be performed only based on the FB terminal voltage, or may be performed only based on the time elapse.

In S309, the control unit 101 reads the time (TH1) according to the IA terminal voltage, from the memory unit 122 in which the time (TH1) is stored in S304. In the case where the memory unit 122 is not a nonvolatile memory such as an FRAM (R) or in the case where the power supply voltage V2 is turned off, the time (TH1) is saved in the memory unit 123 or the like. The control unit 101 determines that the turn-on time of the FET 2 is a time equal to or shorter than one-half (half) of the turn-on time (TH1) of the FET 2 in the switching period (TH3≤TH1/2), turns the FET 2 on, and returns the process to S302. This control corresponds to the above-described control after the switching stops. In S305 and S309, the control may be performed such that the turn-on time of the FET 2 is a predetermined fixed value (stored in a nonvolatile memory of the memory unit 123 of the control unit 101) satisfying the condition of (TH3≤TH1/2). By repeating the above-described control, the control unit 101 controls the switching power supply circuit 100.

As described above, the control unit 101 can surely determine the light load condition based on the FB terminal voltage, and can perform the intermittent control described in FIG. 3A to FIG. 3E. Furthermore, by determining the finish of the switching stop period using the comparison control unit 128, it is possible to improve the power supply efficiency of the switching power supply circuit 100 at the time of the light load.

The switching power supply circuit 100 in the embodiment 1 has the following characteristics.
The switching power supply circuit 100 performs the intermittent operation of repeating the switching period and the switching stop period, in the light load condition of the switching power supply circuit 100.
The switching power supply circuit 100 controls the turn-on time of the FET 1 based on the FB terminal voltage.
The switching power supply circuit 100 controls the turn-on time of the FET 2 (the turn-off time of the FET 1) based on the detection result (the average current value based on the IA terminal voltage in the embodiment 1) of the power supply load.
The switching power supply circuit 100 determines the light load condition based on the FB terminal voltage.

Thus, according to the embodiment 1, it is possible to surely detect the light load condition in the power supply apparatus having an active clamp system, and to perform the intermittent control. Further, it is possible to improve the electric power efficiency at the time of the light load in the power supply apparatus having an active clamp system.

[Construction of Switching Power Supply Circuit]

Figure 7:
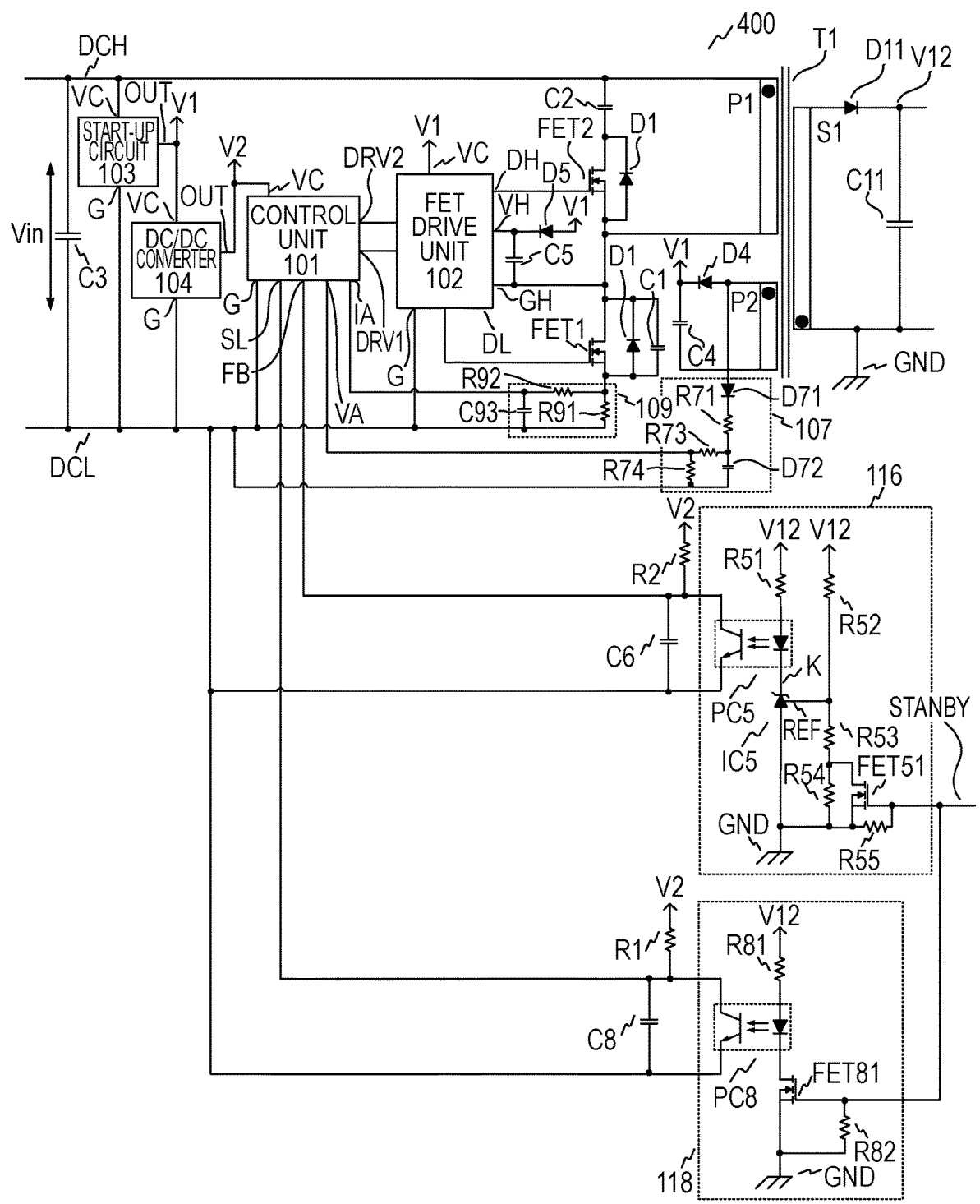
FIG. 7 is a schematic diagram of a power supply circuit in the embodiment 2.

Next, a switching power supply circuit 400 in an embodiment 2 will be described. The same constituents as the embodiment 1 are denoted by the same reference numerals, and the descriptions are omitted. The switching power supply circuit 400 illustrated in FIG. 7 includes a feedback unit 116 as the unit for feedback and a switching control unit 118. Further, the switching power supply circuit 400 includes a voltage detection unit 107 as a voltage detection unit that detects the input voltage Vin. Together with the detection result of the current detection unit 109, the control unit 101 can detect the electric power of load of the switching power supply circuit 400.

The switching control unit 118 performs the switching between two conditions, that is, a stand-by condition in which a first voltage of 24 V is output as the power supply voltage V12 on the secondary side and a sleep condition in which a second voltage of 5 V is output. The embodiment 2 is different from the embodiment 1, in that the switching control unit 118 for performing the switching between the stand-by condition and the sleep condition is included and in that the voltage detection unit 107 is included for electric power detection.

(Feedback Unit)

The feedback unit 116 is different from the feedback unit 115 in the embodiment 1, in that the feedback unit 116 has a function to switch the feedback voltage using resistors R53, R54 and a FET 51. A resistor R55 is connected between the gate terminal and source terminal of the FET 51. A STAND-BY signal is input from a control unit or the like of an electronic device equipped with the switching power supply circuit 400, to the gate terminal of the FET 51 of the feedback unit 116. The STAND-BY signal is a signal for switching the feedback voltage. When the STAND-BY signal becomes a high-level, the FET 51 is turned on, and the resistor R54 is short-circuited. Therefore, the voltage to be input to the reference terminal REF of the shunt regulator IC5 is a voltage after the partial pressure of the power supply voltage V12 with the resistors R52, R53. Thereby, the switching power supply circuit 400 outputs a voltage of 24 V, as the power supply voltage V12 on the secondary side.

On the other hand, when the STAND-BY signal becomes a low-level, the FET 51 is turned off, and the resistor R53 and the resistor R54 are connected in series. Therefore, the voltage to be input to the reference terminal REF of the shunt regulator IC5 is a voltage after the partial pressure of the power supply voltage V12 with the resistor R52 and the combined resistor of the resistor R53 and the resistor R54. Thereby, the switching power supply circuit 400 outputs a voltage of 5 V, as the power supply voltage V12 on the secondary side. Thus, in the embodiment 2, the power supply voltage V12 of the switching power supply circuit 400 is switched between 24 V and 5 V, according to the STAND-BY signal input from the exterior of the switching power supply circuit 400.

(Switching Control Unit)

The switching control unit 118 performs a switching control between the stand-by condition and the sleep condition, according to the STAND-BY signal. The STAND-BY signal is input from a control unit or the like of an electronic device equipped with the switching power supply circuit 400, to the gate terminal of a FET 81 of the switching control unit 118. The STAND-BY signal is a signal for switching the operation condition of the switching power supply circuit 400. A resistor R82 is connected between the gate terminal and source terminal of the FET 81. When the STAND-BY signal having the high-level is input to the switching control unit 118, the FET 81 is turned on, and a secondary-side diode of a photo-coupler PC8 becomes a conduction condition through a resistor R81. Thereby, a primary-side transistor of the photo-coupler PC8 is turned on, and the charges contained in the capacitor C8 are discharged. One end of the capacitor C8 is connected with a SL terminal of the control unit 101, and when the charges in the capacitor C8 are discharged, the voltage (hereinafter, referred to as SL terminal voltage) of the SL terminal of the control unit 101 becomes a low-level.

On the other hand, when the STAND-BY signal having the low-level is input to the switching control unit 118, the FET 81 is turned off, and the secondary-side diode of the photo-coupler PC8 becomes a non-conduction condition. Thereby, the primary-side transistor of the photo-coupler PC8 is turned off, and the capacitor C8 is charged through the resistor R1 by the power supply voltage V2, so that the SL terminal voltage of the control unit 101 becomes a high-level. The control unit 101 determines whether to put the switching power supply circuit 400 into the stand-by condition or the sleep condition, according to the SL terminal voltage.

(Voltage Detection Unit)

The voltage detection unit 107 used for detecting the voltage value of the input voltage Vin will be described. The voltage detection unit 107 rectifies and smooths a forward voltage generated from the auxiliary winding P2, with a diode D74, a resistor R71 and a capacitor C72. After the partial pressure with a resistor R73 and a resistor R74, the voltage detection unit 107 outputs the voltage to the VA terminal of the control unit 101. By detecting the voltage (hereinafter, referred to as VA terminal voltage) input to the VA terminal, the control unit 101 can detect the voltage proportional to the input voltage Vin.

(Power Detection Method)

The control unit 101 performs the multiplication (current× voltage) of the current value (IA terminal voltage) detected by the current detection unit 109 and the input voltage (VA terminal voltage) detected by the voltage detection unit 107. Thereby, the control unit 101 can detect the power value of the load of the switching power supply circuit 400.

In the method described with the switching power supply circuit 100 in the embodiment 1, that is, in the method of detecting the load of the switching power supply circuit 100 based on the IA terminal voltage output by the current detection unit 109, there is a concern that the detection accuracy of the load decreases when the input voltage Vin varies. Specifically, in the case where the load of the switching power supply circuit 100 is constant, the value of the IA terminal voltage to be output by the current detection unit 109 decreases when the input voltage Vin increases, and conversely, the value of the IA terminal voltage to be output by the current detection unit 109 increases when the input voltage Vin decreases. Therefore, by using the power detection method described with the switching power supply circuit 400, the control unit 101 can accurately detect the load of the switching power supply circuit 400.

(Control Method for Power Supply Voltage V12)

Figure 8A:
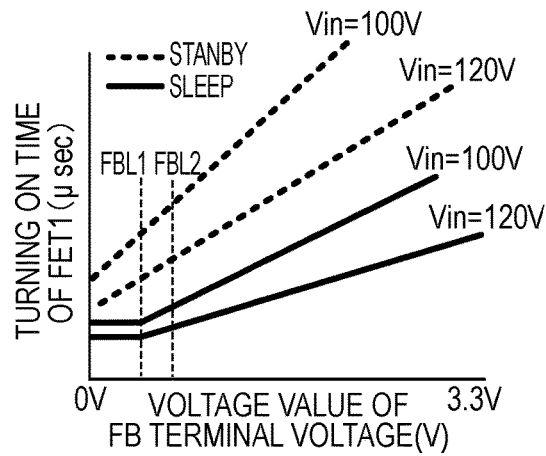
FIGS. 8A, 8B, 8C, 8D, and 8E are explanatory diagrams of a feedback control method in the embodiment 2.

A method of controlling the power supply voltage V12 on the secondary side in the switching period will be described with FIG. 8A. The control of the power supply voltage V12 on the secondary side of the switching power supply circuit 400 is performed by changing the ratio of the turn-on times of the FET 1 and the FET 2. FIG. 8A indicates the voltage value (V) of the FB terminal voltage on the abscissa axis, and indicates the turn-on time (μsec) of the FET 1 on the ordinate axis. Further, solid lines indicate graphs in the sleep condition (SLEEP), and broken lines indicate graphs in the stand-by condition (STAND-BY). Each of graphs in the cases of input voltages Vin of 100 V and 120 V is illustrated. Further, on the FB terminal voltage, the threshold voltages FBL1, FBL2 are also indicated by broken lines. As illustrated in FIG. 8A, in the switching power supply circuit 400, the turn-on time of the FET 1 is controlled based on the FB terminal voltage. In addition, the slope of the increase in the turn-on time of the FET 1 according to the FB terminal voltage and the initial value of the turn-on time of the FET 1 are changed, based on the condition (the stand-by condition, the sleep condition) of the switching power supply circuit 400 and the voltage value (VA terminal voltage) of the input voltage Vin.

(Control Method for FET 1 Using Detection Result of VA Terminal Voltage)

First, a method of changing the turn-on time of the FET 1 based on the detection result of the VA terminal voltage will be described with FIG. 8A. As an example, FIG. 8A indicates values of the turn-on times of the FET 1 in the cases of input voltages Vin of 100 V and 120 V. The control unit 101 performs a control to shorten the turn-on time of the FET 1 when the voltage value of the input voltage Vin is high. Therefore, when the input voltage Vin is 120 V, the slope of the increase in the turn-on time of the FET 1 according to the FB terminal voltage and the initial value of the turn-on time of the FET 1 are set to smaller values than when the input voltage Vin is 100 V. The control of the turn-on time of the FET 1 based on the detection result of the input voltage Vin (VA terminal voltage) may be performed only for one of the above described slope and initial value.

In this way, the control unit 101 controls the turn-on time of the FET 1, using the detection result of the VA terminal voltage. Thereby, the control unit 101 can optimally control the turn-on time of the FET 1 at the time of the intermittent control (at a region of FB<FBL1) in the sleep condition (the time of 5 V output) of the switching power supply circuit 400. During the switching period in the intermittent control, when the turn-on time of the FET 1 is excessively long, the energy for one switching operation of the FET 1 increases, and the high-frequency sound of the transformer T1 increases. Further, when the turn-on time of the FET 1 is excessively short, the number of switching times increases, and the power supply efficiency decreases. Hence, the turn-on time of the FET 1 is controlled to an optical value, using the detection result of the input voltage Vin (VA terminal voltage). Thereby, it is possible to reduce the influence by the variation in the energy for one switching operation due to the variation in the input voltage Vin, and it is possible to prevent the increase in the high-frequency sound of the transformer T1 in the intermittent control and the decrease in the power source efficiency, even when the input voltage Vin varies.

In the stand-by condition (the time of 24 V output) of the switching power supply circuit 400, the turn-on time of the FET 1 is controlled using the detection result of the input voltage Vin (VA terminal voltage). Thereby, it is possible to optimally control the turn-on time of the FET 1 at the time of the continuous control. In the condition of the continuation of the switching period of the switching power supply circuit 400, when the turn-on time of the FET 1 is excessively long with respect to the power supply load, the current to flow to the primary side increases, and the power supply efficiency of the switching power supply circuit 400 decreases. Further, when the turn-on time of the FET 1 is excessively short with respect to the power supply load, it is not possible to continue the soft switching operation described in FIG. 3A to FIG. 3E, causing the decrease in the power supply efficiency of the switching power supply circuit 400. Hence, the turn-on time of the FET 1 is controlled using the detection result of the VA terminal voltage. Thereby, it is possible to reduce the influence by the variation in the energy for one switching operation due to the variation in the input voltage Vin, and to prevent the decrease in the power supply efficiency of the switching power supply circuit 400, even when the input voltage Vin varies.

(Control Method for FET 2 Using Detection Result of Power)

Figure 8D:
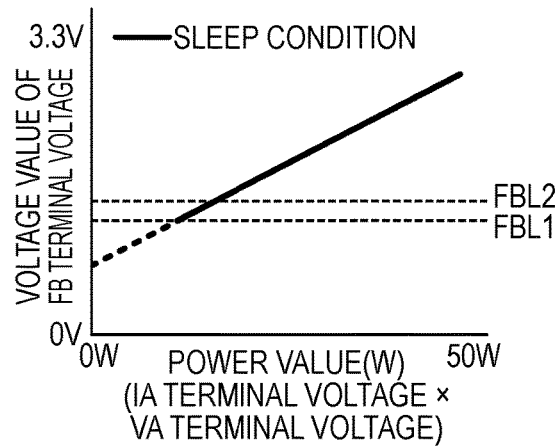
Figure 8B:
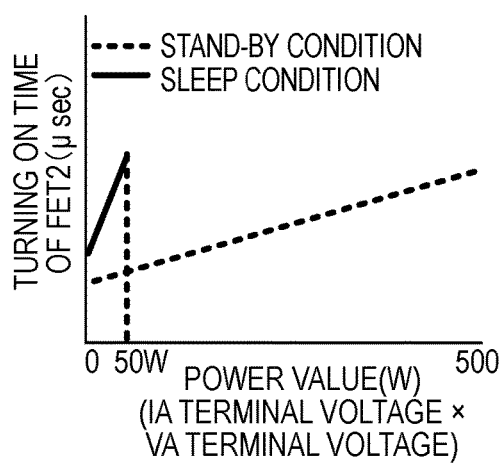

As described above, the control unit 101 detects the power value of the load of the switching power supply circuit 400, based on the IA terminal voltage and the VA terminal voltage. Here, FIG. 8B indicates the power value (W) evaluated from the IA terminal voltage and the VA terminal voltage on the abscissa axis, and indicates the turn-on time (pec) of the FET 2 on the ordinate axis. Further, a solid line indicates the sleep condition, and a broken line indicates the stand-by condition. As illustrated in FIG. 8B, the control unit 101 performs a control to increase the turn-on time of the FET 2 when detecting the increase in the power value of the load of the switching power supply circuit 400. In the sleep condition, the load is light, and the power value is 50 w or lower, because the load (for example, a motor) is disconnected.

(Control in Stand-By Condition)

In the stand-by condition (V12=24 V), since the voltage value of the output voltage V12 is high, it is necessary to perform a control to increase the ratio of the turn-on time of the FET 1 to the turn-on time of the FET 2 compared to the sleep condition (V12=5 V). Further, since the load is larger in the stand-by condition than in the sleep condition, it is necessary to set the turn-on time of the FET 1 to a long time, for continuing the soft switching described with FIG. 3A to FIG. 3E. Therefore, as illustrated in FIG. 8A, the turn-on time of the FET 1 in the stand-by condition is set to a longer time than the turn-on time in the sleep condition. On the other hand, as illustrated in FIG. 8B, the turn-on time of the FET 2 in the stand-by condition is set to a shorter time than the turn-on time of the FET 2 in the sleep condition.

Figure 8E:
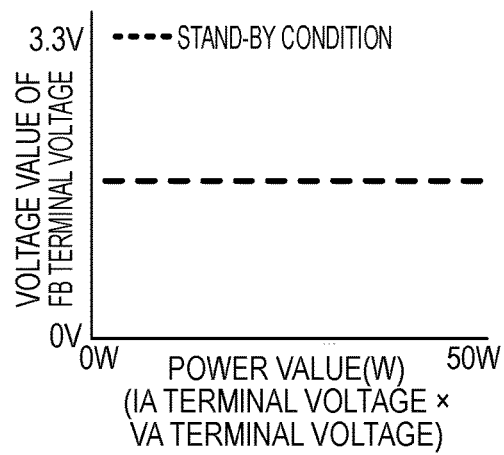
Figure 8C:
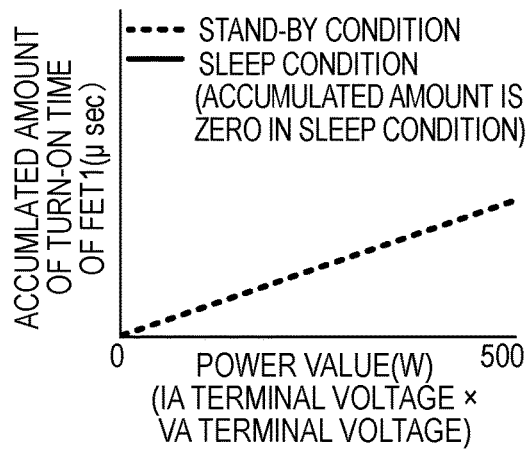

Further, the control in the stand-by condition is basically a control premised on a heavy load of the switching power supply circuit 400, and as illustrated in FIG. 8A, the control unit 101 does not perform the intermittent control even when the FB terminal voltage decreases. In the sleep condition, when the FB terminal voltage becomes equal to or lower than the threshold voltage FBL1, the turn-on time of the FET 1 is kept constant, and the intermittent control is performed. FIG. 8C indicates the power value (W) evaluated from the IA terminal voltage and the VA terminal voltage on the abscissa axis, and indicates the accumulated amount ($\mu$sec) of the turn-on time of the FET 1 on the ordinate axis. A broken line indicates the stand-by condition. A solid line indicates the sleep condition. In the sleep condition, the accumulated amount is zero. As illustrated in FIG. 8C, in the stand-by condition, the control unit 101 performs a control to accumulate the turn-on time of the FET 1 to the turn-on time of the FET 1 illustrated in FIG. 8A when detecting the increase in the power value of the load of the switching power supply circuit 400. For example, in the stand-by condition, the control unit 101 obtains Ton1 [$\mu$sec] as the turn-on time of the FET 1 from FIG. 8A, based on the FB terminal voltage. Further, in the stand-by condition, the control unit 101 obtains $\alpha$ [$\mu$sec] as the accumulated amount of the turn-on time of the FET 1 from FIG. 8C, based on the IA terminal voltage and the VA terminal voltage. Then, the control unit 101 determines that the turn-on time of the FET 1 is Ton1+$\alpha$ [$\mu$sec].

In the embodiment 2, both the turn-on times of the FET 1 and the FET 2 are increased according to the power value of the load of the switching power supply circuit 400. Here, FIG. 8E indicates the power value (W) evaluated from the IA terminal voltage and the VA terminal voltage on the abscissa axis, and indicates the FB terminal voltage (V) on the ordinate axis. Further, a broken line indicates the stand-by condition. By controlling as illustrated in FIG. 8A to FIG. 8C, in the stand-by condition, the FB terminal voltage is constant with respect to the power value as illustrated in FIG. 8E, and it is possible to reduce the variation in the FB terminal voltage due to the power variation of the load. By reducing the variation in the FB terminal voltage in the stand-by condition in this way, it is possible to improve the responsivity to the variation in the load. Further, it is possible to cope with a great load variation (for example, a load variation of 0 to 50 W in the sleep condition and a load variation of 0 to 500 W in the stand-by condition).

The switching power supply circuit 400 in the embodiment 2 is characterized by adding the turn-on time of the FET 1 according to the power value, to the time in FIG. 8A, when detecting the increase in the power value of the load (FIG. 8C). Thereby, the switching power supply circuit 400 in the embodiment 2 is characterized by reducing the variation in the FB terminal voltage due to the power variation of the load, at least, compared to the sleep condition illustrated in FIG. 8D. FIG. 8D indicates the power value (W) evaluated from the IA terminal voltage and the VA terminal voltage on the abscissa axis, and indicates the FB terminal voltage (V) on the ordinate axis. In the sleep condition, when the power value increases, the FB terminal voltage increases. In the sleep condition, as illustrated in FIG. 8D, the FB terminal voltage can vary according to the power value, for accurately detecting that the FB terminal voltage falls below the threshold voltage FBL1 and the switching power supply circuit 400 becomes the light load condition.

(Detection Method for Light Load Condition)

In the embodiment 2, as illustrated in FIG. 8B, in the sleep condition, the control unit 101 performs the control to increase the turn-on time of the FET 2 when detecting the increase in the electric power of the load of the switching power supply circuit 400. The detection method for the light load condition based on the FB terminal voltage illustrated in FIG. 8D is the same as the method in FIG. 5C in the embodiment 1, and the description is omitted.

In the stand-by condition, since the FB terminal voltage is constant as illustrated in FIG. 8E, it is not possible to detect the light load condition based on the FB terminal voltage. However, it is unnecessary to detect the light load condition based on the FB terminal voltage, because the intermittent control is not performed in the stand-by condition.

(Modification of Switching Power Supply Circuit 100, 400)

Figure 9A:
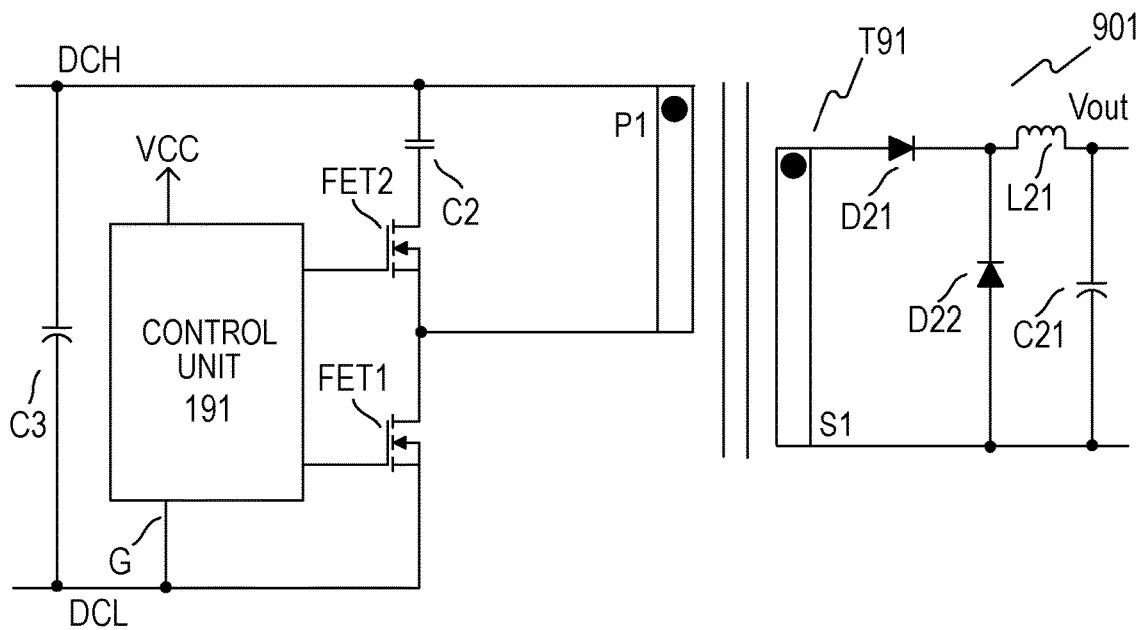
FIGS. 9A and 9B are simplified circuit diagrams of another switching power supply circuit in the embodiment 2.
Figure 9B:
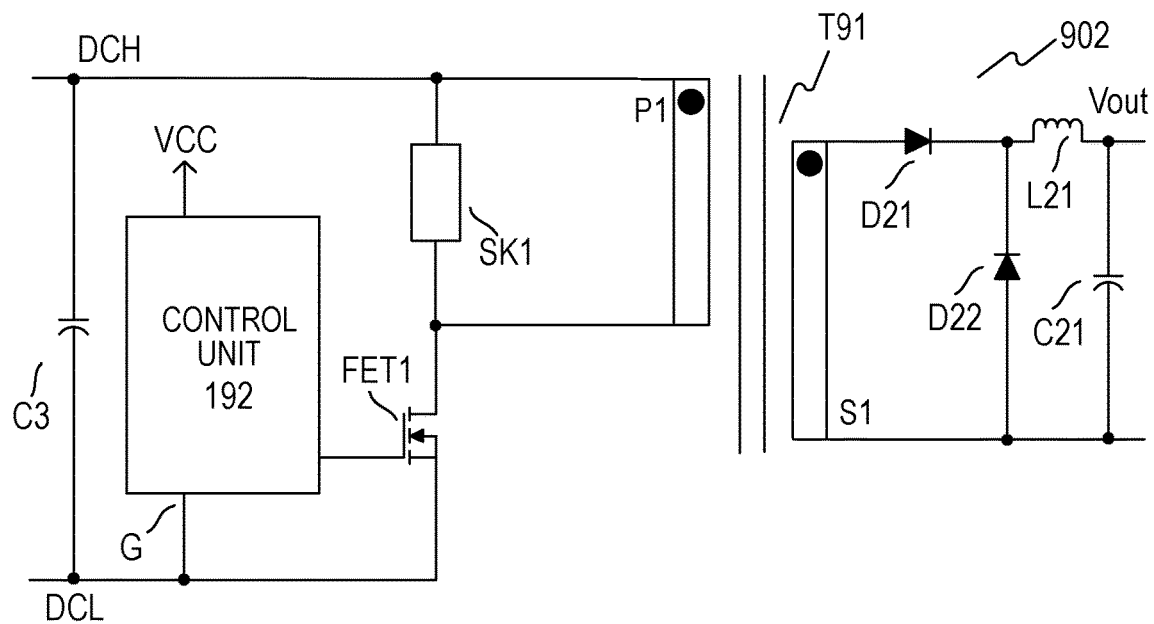

FIG. 9A illustrates a switching power supply circuit 901 using an active clamp system. The switching power supply circuit 901 uses a forward voltage as the output on the secondary side of the transformer T91. Also in the switching power supply circuit 901, the determination method for the light load condition using the FB terminal voltage, which has been described in the embodiment 1 and the embodiment 2, is effective. Further, FIG. 9B illustrates a switching power supply circuit 902 in which the active clamp circuit is removed and a snubber circuit SK1 is added compared to FIG. 9A. Also in the switching power supply circuit 902, the determination method for the light load condition using the FB terminal voltage, which has been described in the embodiment 1 and the embodiment 2, is effective. Coils L21, diodes D21, D22 and capacitors C21 of the switching power supply circuit 901 and the switching power supply circuit 902 are elements for rectifying and smoothing on the secondary side. The control unit 191 controls the switching operation of the FET 1 and the FET 2. The control unit 192 controls the switching operation of the FET 1. The control units 191, 192 operate by the supply of a power supply voltage VCC.

The switching power supply circuit 901 determines an output voltage Vout according to the ratios of the turn-on time of the FET 1 and the turn-on time of the FET 2, similarly to the switching power supply circuit 100 and the switching power supply circuit 400. In such a power supply, the determination of the light load condition based on the FB terminal voltage becomes easy by using the method of controlling the turn-on time of the FET 2 based on the result from detecting the load of the power supply. In the switching power supply circuit 902, the output voltage Vout is determined according to the turn-on duty of the FET 1. In the case of the construction of the embodiment 1, in the switching power supply circuit 902, there is used a method of controlling the turn-off time of the FET 1 based on the result (IA terminal voltage) from detecting the load of the power supply. Further, in the case of the construction of the embodiment 2, there is used a method of controlling the turn-off time of the FET 1 based on the result (IA terminal voltage×VA terminal voltage) from detecting the load of the power supply.

[Control for Switching Power Supply Circuit]

Figure 10:
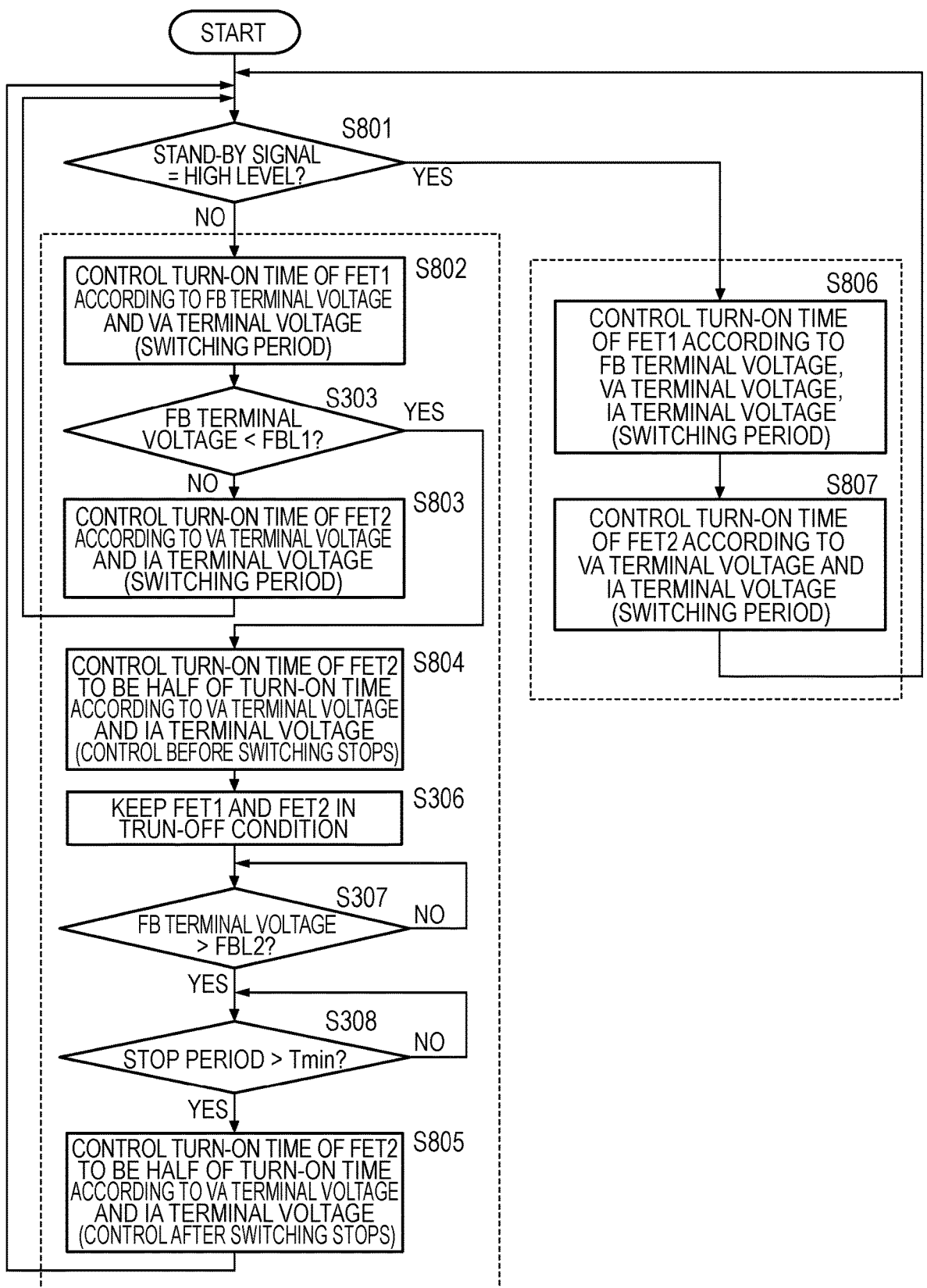
FIG. 10 is a flowchart illustrating a control of the switching power supply circuit in the embodiment 2.

FIG. 10 is a flowchart for describing a control process for the switching power supply circuit 400 by the control unit 101 in the embodiment 2. The same controls as the flowchart in FIG. 6 are denoted by the same step numerals, and the descriptions are omitted. In S801, the control unit 101 determines whether the STAND-BY signal has the high-level, based on the SL terminal voltage. Based on this determination, the control unit 101 performs the determination of the stand-by condition or the sleep condition. In the case of determining that the STAND-BY signal has the high-level in S801, the control unit 101 advances the process to S806. The control unit 101 transitions to the stand-by condition (24 V output). In the case of determining that the STAND-BY signal has the low-level in S801, the control unit 101 advances the process to S802. The control unit 101 transitions to the sleep condition (5 V output).

(Control in Sleep Condition)

In S802, as described with FIG. 8A, the control unit 101 controls the turn-on time of the FET 1 in the switching period, based on the FB terminal voltage and the VA terminal voltage. In S803, as described with FIG. 8B, the control unit 101 calculates the electric power of the load of the switching power supply circuit 400, based on the IA terminal voltage and the VA terminal voltage, and controls the turn-on time of the FET 2, based on the calculation result. In S804, the control unit 101 controls the turn-on time (TH2) of the FET 2, such that the turn-on time (TH2) of the FET 2 is a time (TH2≤TH1/2) equal to or shorter than one-half (half) of the turn-on time of the FET 2 according to the VA terminal voltage and the IA terminal voltage. This control is the control before the switching stops. In S805, the control unit 101 controls the turn-on time (TH3) of the FET 2, such that the turn-on time (TH3) of the FET 2 is a time (TH3≤TH1/2) equal to or shorter than one-half (half) of the turn-on time of the FET 2 according to the VA terminal voltage and the IA terminal voltage. This control is the control after the switching stops.

(Control in Stand-By Condition)

In S806, as described with FIG. 8A, the control unit 101 controls the turn-on time of the FET 1, based on the FB terminal voltage and the VA terminal voltage. Furthermore, as described with FIG. 8C, the control unit 101 calculates the electric power of the load of the switching power supply circuit 400, based on the IA terminal voltage and the VA terminal voltage, and accumulates the turn-on time of the FET 1, based on power calculation result. This control is the control in the switching period. In S807, as described with FIG. 8B, the control unit 101 calculates the electric power of the load of the switching power supply circuit 400, based on the IA terminal voltage and the VA terminal voltage, and controls the turn-on time of the FET 2, based on the power calculation result. This control is the control in the switching period.

In the stand-by condition described in S806 and S807, as illustrated in FIG. 8A and FIG. 8B, the control is performed such that the turn-on time of the FET 1 is longer and the turn-on time of the FET 2 is shorter compared to the sleep condition. By repeating the above-described controls, the control unit 101 performs the controls in the stand-by condition and the sleep condition of the switching power supply circuit 400.

The switching power supply circuit 400 in the embodiment 2 has the following characteristics, in addition to the characteristics of the switching power supply circuit 100.

The power supply voltage V12 of the switching power supply circuit 400 can be set to a plurality of voltages (the voltage of 24 V and the voltage of 5 V).

The switching power supply circuit 400 has a plurality of conditions such as the stand-by condition and the sleep condition.

The intermittent operation of the switching power supply circuit 400 is disabled in the stand-by condition (the condition in which the voltage of 24 V is output).

The intermittent operation of the switching power supply circuit 400 is enabled in the sleep condition (the voltage of 5 V is output).

The turn-on time of the FET 2 (the turn-off time of the FET 1) is controlled based on the detection result (the average power value based on the IA terminal voltage and the VA terminal voltage in the embodiment 2) of the power supply load.

In the stand-by condition, the turn-on time of the FET 1 is controlled based on the detection result (the average power value based on the IA terminal voltage and the VA terminal voltage in the embodiment 2) of the power supply load.

The switching power supply circuit 100 in the embodiment 1 may have a construction in which the switching control unit 118 is added. The switching power supply circuit 400 in the embodiment 2 may have a construction in which the switching control unit 118 is excluded.

Thus, according to the embodiment 2, it is possible to improve the power efficiency at the time of the light load in the power supply apparatus having an active clamp system. Further, in power supply apparatus having an active clamp system, it is possible to improve the power efficiency at the time of the light load in the sleep condition, and to improve the power efficiency and the responsivity in the stand-by condition.

The switching power supply circuits 100, 400 as the power supply apparatuses described in the embodiments 1, 2 can be applied, for example, to a low-voltage power supply of the image forming apparatus, that is, a switching power supply that supplies the electric power to a controller (control unit) or a driving unit such as a motor. Hereinafter, the construction of an image forming apparatus to which the switching power supply circuits 100, 400 in the embodiments 1, 2 are applied will be described.

[Construction of Image Forming Apparatus]

Figure 11:
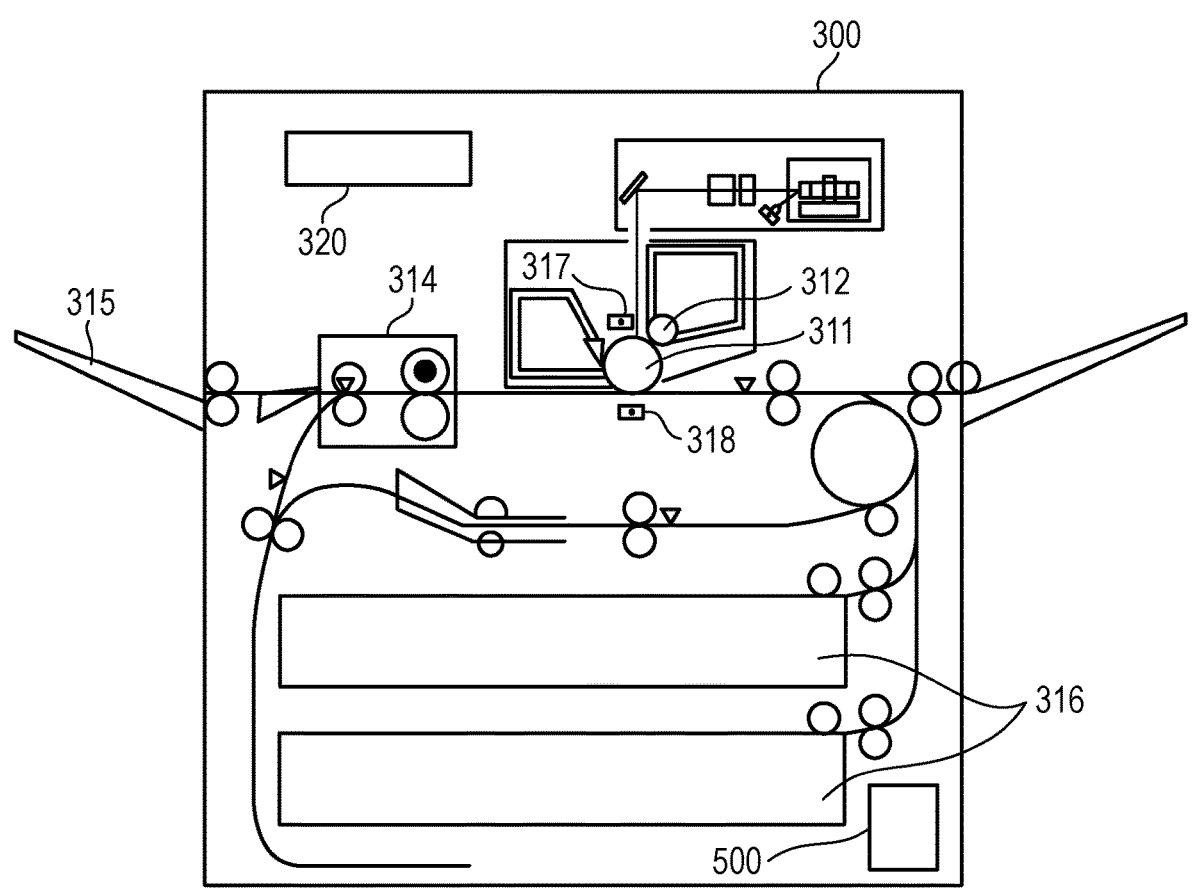
FIG. 11 is a diagram illustrating an image forming apparatus in an embodiment 3.

As an example of the image forming apparatus, a laser beam printer will be described. FIG. 11 illustrates a schematic construction of a laser beam printer that is an example of a printer having an electrophotographic system. A laser beam printer 300 includes a photosensitive drum 311 as an image bearing member on which an electrostatic latent image is formed, a charging unit 317 (charging device) that evenly charges the photosensitive drum 311, and a developing unit 312 (developing device) that develops the electrostatic latent image formed on the photosensitive drum 311 with a toner. Then, the toner image developed on the photosensitive drum 311 is transferred on a sheet (not illustrated) as a recording member supplied from a cassette 316, by a transfer unit 318 (transfer device). The toner image transferred to the sheet is fixed by a fixing device 314, and is ejected to a tray 315. The photosensitive drum 311, the charging unit 317, the developing unit 312 and the transfer unit 318 constitute an image forming unit. The laser beam printer 300 includes a switching power supply circuit 500. The switching power supply circuit 500 is the switching power supply circuit 100 in the embodiment 1 or the switching power supply circuit 400 in the embodiment 2. The image forming apparatus to which the switching power supply circuit 500 can be applied is not limited to the image forming apparatus exemplified in FIG. 11, and for example, may be an image forming apparatus including a plurality of image forming units. Furthermore, the image forming apparatus may be an image forming apparatus including a primary transfer unit that transfers the toner image on the photosensitive drum 311, to an intermediate transfer belt, and a secondary transfer unit that transfers the toner image on the intermediate transfer belt, to the sheet.

The laser beam printer 300 includes a controller 320 as a control unit that controls an image forming operation by the image forming unit and a sheet conveyance operation. The switching power supply circuit 500 supplies electric power to the controller 320, for example. Further, the switching power supply circuit 500 supplies electric power to a driving unit such as a motor for rotating the photosensitive drum 311 or for driving various rollers to convey the sheet.

An image forming apparatus in the embodiment 3 can operate in one of a normal operation mode, the stand-by condition and the sleep condition. In this case, the switching power supply circuit 400 in the embodiment 2 is equipped in the image forming apparatus. The stand-by condition (the condition of V12=24 V) is a mode in which power consumption is reduced compared to the normal operation mode for performing the image forming operation and the image forming operation can be executed immediately when a print instruction is received. The sleep condition is a mode in which power consumption is further reduced compared to the stand-by condition (the condition of V12=5 V).

For example, the controller 320 outputs the STAND-BY signal to the switching power supply circuit 500. As described in FIG. 8A to FIG. 8E and FIG. 10, in the switching power supply circuit 400, the control unit 101 detects the condition of the STAND-BY signal, based on the SL terminal voltage, and performs a control appropriate for one of the sleep condition and the stand-by condition (normal operation mode). In the image forming apparatus in the embodiment 3, the controller 320 outputs the STAND-BY signal having the high-level, in the normal operation mode. In the normal operation mode, the switching power supply circuit 500 is in the stand-by condition. Thereby, it is possible to improve the power efficiency at the time of the light load in the sleep condition of the switching power supply circuit 500, and to improve the power efficiency and the responsivity in the stand-by condition. Thus, according to the embodiment 3, also in the image forming apparatus equipped with the power supply apparatus having an active clamp system, it is possible to improve the power efficiency at the time of the light load.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156868, filed Aug. 15, 2017, which is hereby incorporated by reference herein in its entirety.

What is claimed is:

1. A power supply apparatus comprising:
   a transformer including a primary winding and a secondary winding;
   a first switching element connected in series with the primary winding of the transformer;
   a second switching element connected in parallel with the primary winding of the transformer;
   a capacitor connected in series with the second switching element and connected in parallel with the primary winding of the transformer together with the second switching element;
   a feedback unit configured to output a feedback voltage to a primary side according to a voltage induced in the secondary winding of the transformer;
   a control unit configured to control turn-on or turn-off of the first switching element and the second switching element based on the feedback voltage, the control unit configured to selectively perform an operation of a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition; and
   a current detection unit configured to detect a current that flows through the first switching element, wherein the current detection unit includes a resistor element connected in series with the first switching element,
   wherein the control unit performs switching between a continuous control and an intermittent control based on the feedback voltage, the continuous control being a control to perform an operation of continuing the first period so as to output a first voltage from the secondary winding, the intermittent control being a control to perform an operation of alternately repeating the first period and the second period so as to output a second voltage which is lower than the first voltage from the second winding, and
   wherein in a case while the control unit is performing the intermittent control so as to output the second voltage from the secondary winding, the control unit controls a turn-on time of the first switching element based on the feedback voltage, and controls a turn-on time of the second switching element based on a detection result of the current detection unit.

2. A power supply apparatus according to claim 1, wherein the control unit increases the turn-on time of the second switching element so that the current detected by the current detection unit is higher.

3. A power supply apparatus according to claim 1, wherein in a case while the control unit is performing the continuous control, the control unit controls the turn-on time of the first switching element and the turn-on time of the second switching element based on the feedback voltage.

4. A power supply apparatus comprising:
   a transformer including a primary winding on a primary side and a secondary winding on a secondary side;
   a first switching element connected in series with the primary winding of the transformer;
   a second switching element connected in parallel with the primary winding of the transformer;
   a capacitor connected in series with the second switching element and connected in parallel with the primary winding of the transformer together with the second switching element;
   a feedback unit configured to output a feedback voltage to a primary side according to a voltage induced in the secondary winding of the transformer;
   a control unit configured to control turn-on or turn-off of the first switching element and the second switching element based on the feedback voltage, the control unit configured to selectively perform an operation of a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition;
   a current detection unit configured to detect a current that flows through the first switching element, wherein the current detection unit includes a resistor element connected in series with the first switching element; and
   a voltage detection unit configured to detect an input voltage supplied to the primary side of the transformer,
   wherein the control unit performs switching between a continuous control and an intermittent control based on the feedback voltage, the continuous control being a control to perform an operation of continuing the first period so as to output a first voltage from the secondary winding, the intermittent control being a control to perform an operation of alternately repeating the first period and the second period so as to output a second voltage which is lower than the first voltage from the secondary winding, and
   wherein the control unit controls a turn-on time of the first switching element based on the feedback voltage and a detection result of the voltage detection unit, and controls a turn-on time of the second switching element based on detection results of the current detection unit and the voltage detection unit.

5. A power supply apparatus according to claim 4, wherein the control unit increases the turn-on time of the second switching element as a value of a product of the current detected by the current detection unit and the input voltage detected by the voltage detection unit is larger.

6. A power supply apparatus according to claim 5, wherein the control unit decreases the turn-on time of the first switching element as the input voltage detected by the voltage detection unit is higher.

7. A power supply apparatus according to claim 4, wherein the control unit decreases the turn-on time of the first switching element as the input voltage detected by the voltage detection unit is higher.

8. A power supply apparatus according to claim 4, comprising a switching unit configured to switch an output voltage to be output from the secondary side of the transformer, between the first voltage and the second voltage lower than the first voltage, according to a signal that is externally input,
wherein the control unit performs the continuous control without performing the intermittent control, in a first condition in which the switching unit switches the output voltage to the first voltage.

9. A power supply apparatus according to claim 8, wherein the control unit increases the turn-on time of the first switching element in the first condition, compared to the turn-on time of the first switching element in a second condition in which the switching unit switches the output voltage to the second voltage.

10. A power supply apparatus according to claim 9, wherein the control unit adds a time according to the detection results of the current detection unit and the voltage detection unit, to the turn-on time of the first switching element in the first condition.

11. A power supply apparatus according to claim 8, wherein the control unit increases the turn-on time of the second switching element in a second condition in which the switching unit switches the output voltage to the second voltage, compared to the turn-on time of the second switching element in the first condition.

12. A power supply apparatus according to claim 4, wherein the control unit increases the turn-on time of the first switching element as the feedback voltage is higher.

13. A power supply apparatus according to claim 4, wherein the control unit performs switching from the continuous control to the intermittent control, when the feedback voltage falls below a first threshold.

14. A power supply apparatus according to claim 13, wherein the control unit keeps the turn-on time of the first switching element constant in the intermittent control, when there is no change in the input voltage detected by the voltage detection unit.

15. A power supply apparatus according to claim 13, wherein the control unit performs switching from the intermittent control to the continuous control, when the feedback voltage exceeds a second threshold higher than the first threshold.

16. A power supply apparatus according to claim 4, wherein in a case while the control unit is performing the continuous control, the control unit controls the turn-on time of the first switching element and the turn-on time of the second switching element based on the feedback voltage.

17. An image forming apparatus comprising:
an image forming unit configured to perform image formation on a recording member; and
a power supply apparatus configured to supply electric power to the image forming apparatus,
the power supply apparatus including:
a transformer including a primary winding on a primary side and a secondary winding on a secondary side;
a first switching element connected in series with the primary winding of the transformer;
a second switching element connected in parallel with the primary winding of the transformer;
a capacitor connected in series with the second switching element and connected in parallel with the primary winding of the transformer together with the second switching element;
a feedback unit configured to output a feedback voltage to a primary side according to a voltage induced in the secondary winding of the transformer;
a control unit configured to control turn-on or turn-off of the first switching element and the second switching element based on the feedback voltage, the control unit configured to selectively perform an operation of a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition; and
a current detection unit configured to detect a current that flows through the first switching element, wherein the current detection unit includes a resistor element connected in series with the first switching element,
wherein the control unit performs switching between a continuous control and an intermittent control based on the feedback voltage, the continuous control being a control to perform an operation of continuing the first period so as to output a first voltage from the secondary winding, the intermittent control being a control to perform an operation of alternately repeating the first period and the second period so as to output a second voltage which is lower than the first voltage from the secondary winding, and
wherein in a case while the control unit is performing the intermittent control so as to output the second voltage from the secondary winding, the control unit controls a turn-on time of the first switching element based on the feedback voltage, and controls a turn-on time of the second switching element based on a detection result of the current detection unit.

18. An image forming apparatus according to claim 17, comprising a controller configured to control the image forming unit and the power supply apparatus,
wherein the controller outputs a signal to control a switching unit to switch between the continuous control and the intermittent control.

19. An image forming apparatus according to claim 18, wherein the power supply apparatus supplies electric power to the controller.

20. An image forming apparatus according to claim 17, wherein in a case while the control unit is performing the continuous control, the control unit controls the turn-on time of the first switching element and the turn-on time of the second switching element based on the feedback voltage.

21. An image forming apparatus comprising:
an image forming unit configured to perform image formation on a recording member; and
a power supply apparatus configured to supply electric power to the image forming apparatus,
the power supply apparatus including:
a transformer including a primary winding and a secondary winding;
a first switching element connected in series with the primary winding of the transformer;
a second switching element connected in parallel with the primary winding of the transformer;
a capacitor connected in series with the second switching element and connected in parallel with the primary winding of the transformer together with the second switching element;

a feedback unit configured to output a feedback voltage to a primary side according to a voltage induced in the secondary winding of the transformer;

a control unit configured to control turn-on or turn-off of the first switching element and the second switching element based on the feedback voltage, the control unit configured to selectively performing an operation of a first period in which a switching operation is performed and a second period in which the switching operation is stopped, the switching operation being an operation of alternately turning on or turning off the first switching element and the second switching element before and after a dead time in which both the first switching element and the second switching element are in a turn-off condition;

a current detection unit configured to detect a current that flows through the first switching element, wherein the current detection unit includes a resistor element connected in series with the first switching element; and a voltage detection unit configured to detect an input voltage supplied to the primary side of the transformer, wherein the control unit performs switching between a continuous control and an intermittent control based on the feedback voltage, the continuous control being a control to perform an operation of continuing the first period so as to output a first voltage from the secondary winding, the intermittent control being a control to perform an operation of alternately repeating the first period and the second period so as to output a second voltage which is lower than the first voltage from the secondary winding, and wherein the control unit controls a turn-on time of the first switching element based on the feedback voltage and a detection result of the voltage detection unit, and controls a turn-on time of the second switching element based on detection results of the current detection unit and the voltage detection unit.

22. An image forming apparatus according to claim 21, comprising a controller configured to control the image forming unit and the power supply apparatus, wherein the controller outputs a signal to control a switching unit to switch between the continuous control and the intermittent control.

23. An image forming apparatus according to claim 21, wherein the power supply apparatus supplies electric power to the controller.

24. An image forming apparatus according to claim 21, wherein in a case while the control unit is performing the continuous control, the control unit controls the turn-on time of the first switching element and the turn-on time of the second switching element based on the feedback voltage.

* * * * *